United States Patent
Chen et al.

(10) Patent No.: US 10,181,165 B2
(45) Date of Patent: Jan. 15, 2019

(54) CRITICAL PEAK PRICING DEMAND RESPONSE PARTICIPANT ASSESSMENT

(71) Applicant: FUJITSU LIMITED, Kawasaki-shi, Kanagawa (JP)

(72) Inventors: Wei-Peng Chen, Fremont, CA (US); Dawei He, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 200 days.

(21) Appl. No.: 15/043,334

(22) Filed: Feb. 12, 2016

(65) Prior Publication Data
US 2017/0236222 A1  Aug. 17, 2017

(51) Int. Cl.
G06Q 30/00 (2012.01)
G06Q 10/00 (2012.01)
G06Q 50/06 (2012.01)
G06Q 30/02 (2012.01)

(52) U.S. Cl.
CPC ......... *G06Q 50/06* (2013.01); *G06Q 30/0206* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | | |
|---|---|---|---|---|
| 6,868,293 B1* | 3/2005 | Schurr | ............... | G05D 23/1905 323/211 |
| 7,305,281 B2* | 12/2007 | Scott | ...................... | G06Q 40/04 700/286 |
| 7,359,878 B2* | 4/2008 | Peljto | ..................... | G05B 19/00 705/37 |
| 8,019,697 B2* | 9/2011 | Ozog | ............... | G06Q 10/06315 705/400 |
| 8,200,370 B2* | 6/2012 | Paik | .......................... | H02J 3/14 700/12 |
| 9,412,082 B2* | 8/2016 | Tyagi | ..................... | G06Q 10/04 |

(Continued)

OTHER PUBLICATIONS

Hosseini Imani, M.; Niknejad, Payam; Barzegaran, M.R.. In International Journal of Electrical Power and Energy Systems. Mar. 2018 96:114-125 Language: English. DOI: 10.1016/j.ijepes.2017.09.038.*

(Continued)

*Primary Examiner* — Alan S Miller
(74) *Attorney, Agent, or Firm* — Maschoff Brennan

(57) ABSTRACT

A method of critical peak pricing (CPP) demand response (DR) event implementation includes performing an initial CPP participant selection assessment. The method includes generating an initial CPP participant selection and an estimated CPP curtailment based on the initial CPP participant selection assessment. The method includes calculating a reduced day-ahead demand. The method includes evaluating the reduced day-ahead demand. The method includes submitting an energy bid to a market server. The method includes forecasting a revised real time price. The method includes performing a final CPP participation selection assessment. The method may include generating a final CPP participant selection to include the CPP participants having accumulated individual participant revenue effects up to the reduced day-ahead demand. The method includes communicating CPP event notifications to each of the CPP participants in the final CPP participant selection.

21 Claims, 13 Drawing Sheets

(56) References Cited

U.S. PATENT DOCUMENTS

| | | | | |
|---|---|---|---|---|
| 9,852,481 | B1* | 12/2017 | Turney | G06Q 50/06 |
| 2002/0019758 | A1* | 2/2002 | Scarpelli | G06Q 10/06 705/26.2 |
| 2003/0041002 | A1* | 2/2003 | Hao | G06Q 30/06 705/37 |
| 2003/0055677 | A1* | 3/2003 | Brown | G06O 30/06 700/291 |
| 2003/0171851 | A1* | 9/2003 | Brickfield | H02J 3/008 700/286 |
| 2004/0215529 | A1* | 10/2004 | Foster | G06Q 30/06 705/26.1 |
| 2005/0050893 | A1* | 3/2005 | Ouden | G06Q 40/04 60/676 |
| 2006/0031180 | A1* | 2/2006 | Tamarkin | G01D 4/004 705/412 |
| 2006/0259199 | A1* | 11/2006 | Gjerde | H02J 3/14 700/284 |
| 2008/0313101 | A1* | 12/2008 | Helander | G06Q 30/02 705/400 |
| 2009/0254225 | A1* | 10/2009 | Boucher | G06Q 30/02 700/295 |
| 2010/0106641 | A1* | 4/2010 | Chassin | G06Q 20/102 705/40 |
| 2010/0138363 | A1* | 6/2010 | Batterberry | G06Q 10/04 705/412 |
| 2010/0179704 | A1* | 7/2010 | Ozog | G06Q 10/06315 700/291 |
| 2010/0179862 | A1* | 7/2010 | Chassin | G06Q 10/06 705/412 |
| 2010/0187219 | A1* | 7/2010 | Besore | G06Q 50/06 219/494 |
| 2010/0218108 | A1* | 8/2010 | Crabtree | G06Q 50/06 715/738 |
| 2010/0299284 | A1* | 11/2010 | Gristina | G06O 50/06 705/412 |
| 2010/0332373 | A1* | 12/2010 | Crabtree | G06Q 40/04 705/37 |
| 2011/0106328 | A1* | 5/2011 | Zhou | G05B 13/024 700/291 |
| 2011/0153102 | A1* | 6/2011 | Tyagi | G06Q 10/04 700/291 |
| 2011/0288905 | A1* | 11/2011 | Mrakas | G06Q 10/06 705/7.25 |

OTHER PUBLICATIONS

Faruqui, Ahmad, and Sanem Sergici. "Household response to dynamic pricing of electricity: a survey of 15 experiments." Journal of regulatory Economics 38.2 (2010): 193-225.*

Herter, Karen, Patrick McAuliffe, and Arthur Rosenfeld. "An exploratory analysis of California residential customer response to critical peak pricing of electricity." Energy 32.1 (2007): 25-34.*

Albadi, Mohamed H., and Ehab F. El-Saadany. "A summary of demand response in electricity markets." Electric power systems research 78.11 (2008): 1989-1996.*

Herter, Karen, and Seth Wayland. "Residential response to critical-peak pricing of electricity: California evidence." Energy 35.4 (2010): 1561-1567.*

Wolak, Frank A. "Residential customer response to real-time pricing: The anaheim critical peak pricing experiment." (2007).*

Roscoe, Andrew J., and G. Ault. "Supporting high penetrations of renewable generation via implementation of real-time electricity pricing and demand response." IET Renewable Power Generation 4.4 (2010): 369-382.*

Park, S.C., et al. "Designing a Critical Peak Pricing Scheme for the Profit Maximization Objective Considering Price Responsiveness of Customers." Energy, vol. 83, Apr. 1, 2015, pp. 521-531. EBSCOhost, doi:10.1016/j.energy.2015.02.057.*

Wang, Rui_Kandasamy, Nagarajan_Nwankpa, Chika_Kaeli, David, 2013, Datacenters as Controllable Load Resources in the Electricity Market, IEEE Computer Society, pp. 176-185 (Year: 2013).*

Q. Zhang, X. Wang, and M. Fu, "Optimal implementation strategies for critical peak pricing," Energy Market, 2009. EEM 2009. 6th International Conference on the European, pp. 1-6, Aug. 18, 2009.

Zhang, X. "Optimal Scheduling of Critical Peak Pricing Considering Wind Commitment", IEEE Transactions on Sustainable Energy, vol. 5, No. 2, Apr. 2014 637.

Petersen, J.; Black, J.W.; Tyagi, R.; Optimal Scheduling of Demand Response Events using Options Valuation Methods, IEEE Power and Energy Society General Meeting, 2011.

* cited by examiner

CRITICAL PEAK PRICING DEMAND RESPONSE PARTICIPANT ASSESSMENT

FIELD

The embodiments discussed herein are related to critical peak pricing demand response participant assessment.

BACKGROUND

Utilities incentivize curtailment of energy usage during certain high load periods to increase the ability of the utilities to meet a larger demand or to minimize production costs. For example, in summer months, peak energy usage may occur on hot days in the late afternoon. A utility may offer an incentive to a factory to reduce energy usage during the late afternoon. In response, the factory may delay a high load production run until later in the evening, turn down the air-conditioning in the factory, or otherwise reduce energy use. In this manner, the utility may increase its ability to meet energy demands during the peak energy usage and/or avoid producing or purchasing additional energy to meet the energy demands.

The curtailment in energy usage during peak or high load periods may be referred to generally as demand response (DR). The energy usage curtailment during a specified time period may be referred to as a DR event. DR events generally occur when a utility expects a high demand and asks customers to reduce or curtail energy usage. When a customer reduces its energy usage by an agreed-upon amount, the utility may provide an incentive to the customer.

Critical peak pricing (CPP) is a tariff that is applied to some energy customers, hereinafter CPP participants, during periods in which energy load is particularly high or during emergencies. In exchange for the CPP, the customers may be charged at a reduced rate during other periods. Generally, the customers that are involved in CPP programs are entities that have high (e.g., over 20 kilowatts (kW)) energy usage.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an embodiment a method of critical peak pricing (CPP) demand response (DR) event implementation may include determining whether CPP event notifications are broadcast to CPP participants in a CPP DR system. In response to the CPP event notifications being unicast, the method may include determining whether curtailment behavior of one or more of the CPP participants is a factor in load estimations during the CPP DR event. In response to the curtailment behavior being a factor, the method may include determining whether DR assessments consider one or more energy market condition factors. In response to the DR assessments considering the energy market condition factors, the method may include performing an initial CPP participant selection assessment. The initial CPP participant selection assessment may include calculation of an individual participant revenue effect for the CPP participants based on historical real-time price data, historical load data, and historical curtailment behavior data; calculation of participant revenue thresholds based on event participant limit, and comparison between the individual participant revenue effects and the participant revenue thresholds. In response to the DR assessments considering the energy market condition factors, the method may include generating an initial CPP participant selection and an estimated CPP curtailment based on the initial CPP participant selection assessment. In response to the DR assessments considering the energy market condition factors, the method may include calculating a reduced day-ahead demand, the reduced day-ahead demand being a portion of the estimated CPP curtailment based on the initial CPP participant selection.

In response to the DR assessments considering the energy market condition factors, the method may include evaluating the reduced day-ahead demand to ensure that reductions in energy use by the CPP participants of the initial CPP participant selection do not frustrate efficiencies introduced through the estimated CPP curtailment. In response to the DR assessments considering the energy market condition factors, the method may include submitting an energy bid to a market server. The energy bid may include a day-ahead demand and a day-ahead price based on the reduced day-ahead demand. In response to the DR assessments considering the energy market condition factors, the method may include forecasting a revised real time price based on day-ahead market results received from the market server.

In response to the DR assessments considering the energy market condition factors, the method may include performing a final CPP participation selection assessment. The final CPP participation assessment may include re-calculating the individual participant revenue effects for the CPP participants based on a forecasted revised real time price. The final CPP participation assessment may include sorting the individual participant revenue effects in decreasing order. The final CPP participation assessment may include calculating accumulated CPP curtailments from the sorted individual participant revenue effects. The final CPP participation assessment may include comparing the accumulated CPP curtailments with the reduced day-ahead demand. In response to the DR assessments considering the energy market condition factors, the method may include generating a final CPP participant selection to include the CPP participants having accumulated individual participant revenue effects up to the reduced day-ahead demand. In response to the DR assessments considering the energy market condition factors, the method may include communicating CPP event notifications to each of the CPP participants in the final CPP participant selection. The CPP event notifications are configured to prompt adjustment of loads by the CPP participants.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Demand response (DR) events include times in which a utility incentivizes curtailment of energy usage by customers. A type of DR events may be executed in energy systems implementing critical peak pricing (CPP). In general, CPP DR events may include CPP event notifications to CPP participants that alert the CPP participants of a period in which CPP is applied. In response to the CPP event notifications, the CPP participants may reduce a load, which may reduce their costs. In addition, lowering the load by the CPP participants may make available energy that may be sold at a CPP tariff to other customers.

However, in current CPP DR programs, utilities dispatch CPP event notifications to all the CPP participants. In addition, the determination as to whether the CPP event notification is appropriate is based on a day-ahead electricity price and/or historical empirical price data. Basing such determination on the day-ahead electricity prices and/or the historical empirical price data may result in inefficiencies. For instance, it may be determined from recent energy use data that a CPP participant is not currently occupying a site. Thus, communication of the CPP event notification to the CPP participant will likely not result in any energy curtailment.

Accordingly, some embodiments described in this disclosure include a comprehensive framework for CPP strategies. For example, these and other embodiments provide CPP participant selection assessments and/or revision of day-ahead demand forecast based on the CPP participant selection. Some embodiments base the CPP strategies on the historical pricing and demand data as well as individual customer behavior. Compared to simple broadcast methodology, the embodiments described in this disclosure may apply CPP DR resources more precisely into energy market operations, which may result in higher utility revenue. These and other embodiments are described with reference to the figures. In the figures, common item numbers represent similar features unless otherwise described.

Figure 1:
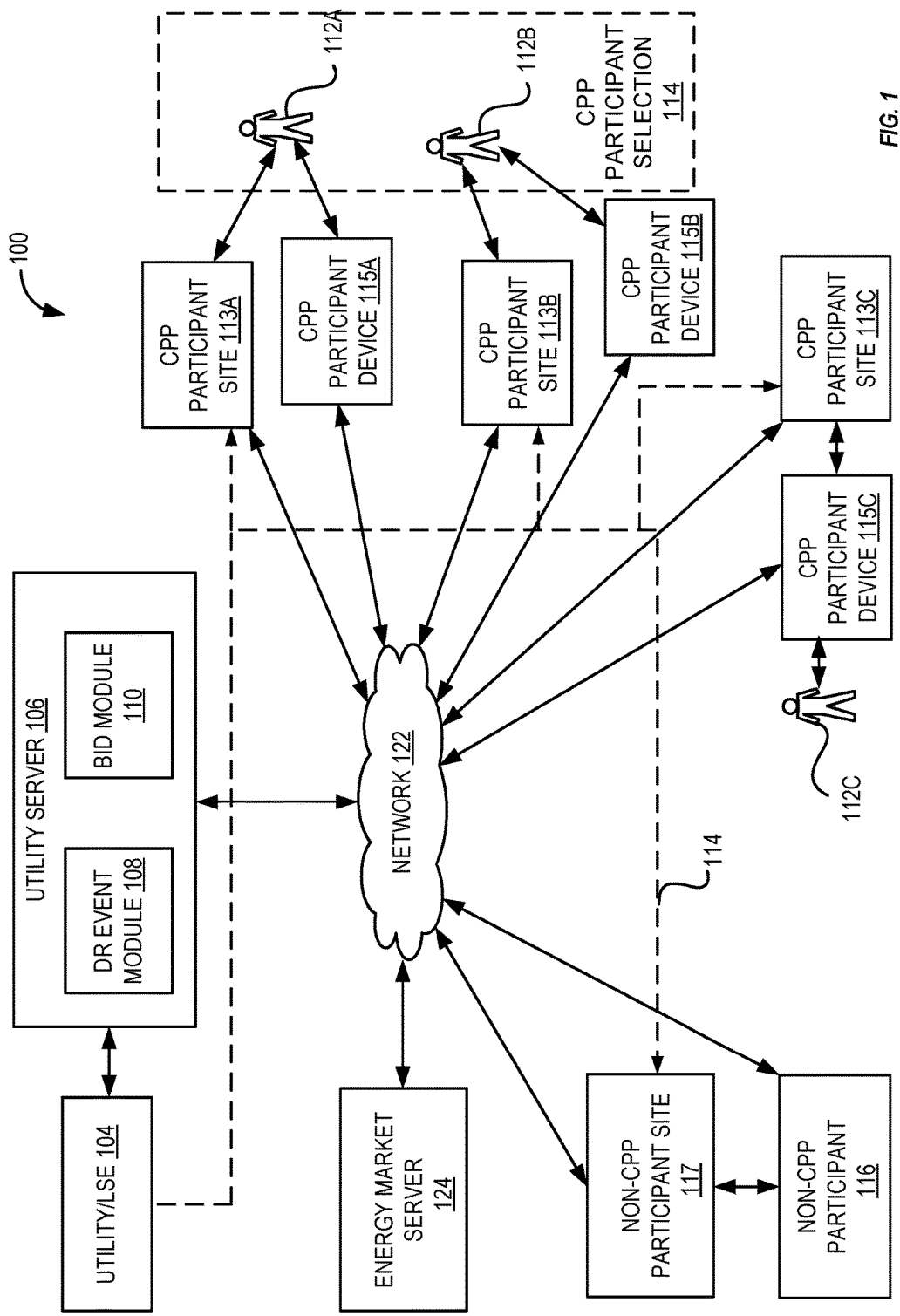
FIG. 1 is a block diagram of an example critical peak pricing (CPP) demand response (DR) system.

FIG. 1 is a block diagram of an example CPP DR system 100, arranged in accordance with at least one embodiment described herein. In the CPP DR system 100, a utility or an LSE 104 (hereinafter, utility 104) may assess which of multiple CPP participants 112A-112C (generally, CPP participant 112 or CPP participants 112) to include in a CPP DR event. In addition, the utility 104 may be configured to revise day-ahead demand forecasts based on the CPP participants selected for the CPP DR event.

For example, in response to a CPP event notification communicated by the utility 104 to the CPP participant 112, the CPP participant 112 may reduce energy use at an associated CPP participant site 113A-113C (generally, site 113 or sites 113). Reduced energy use at the site 113 or sites 113 may affect an energy price because reduction in the energy use may reduce demand for energy, which in turn may reduce the energy price.

Based on the CPP participant assessment, the utility 104 may generate a CPP participant selection 114, which may include a subset of the CPP participants 112. The utility 104 may communicate to the CPP participants 112 included in the CPP participant selection 114 CPP event notifications. The CPP event notification may be configured to prompt adjustment of loads by the CPP participants 112 of the sites 113.

The CPP participant assessment may identify the CPP participants 112 such that a profitability of the utility 104 may be increased while agreements between the utility 104 and the CPP participants 112 are complied with. For example, the CPP participants 112 may agree to participate in ten CPP DR events per some designated time period such as a year. A number of CPP DR events the CPP participants 112 have agreed to be included is referred to as an event participation limit. Thus, the utility 104 may be configured to ensure that the CPP participants 112 are not included in more than the event participation limit. The CPP participant assessment may be based at least partially on historical data, real time market conditions, and behaviors of the CPP participants 112.

The CPP DR system 100 depicted in FIG. 1 may include the utility 104, the CPP participants 112, CPP participant devices 115A-115C (generally, device 115 or devices 115) and the sites 113 that are associated with the CPP participants 112, an energy market server 124, a utility server 106 associated with the utility 104, and a non-CPP participant 116 that may be associated with a non-CPP participant site (non-CPP site) 117. The term "associated with," when used to refer to a relationship between an entity and a system (e.g., the utility server 106) or site 113/117 (e.g., utility server 106 and the utility 104, sites 113 and the CPP participants 112, etc.) may indicate that the entity owns or otherwise controls, directly or indirectly, the system or site. For example, information communicated from the utility server 106 may be controlled by the utility 104 and information communicated to the utility server 106 may be intended for the utility 104.

The utility server 106, the CPP participants 112, the site 113, the non-CPP site 117, the non-CPP participant 116, and the energy market server 124 (collectively "system components) may be communicatively coupled via a network 122. The system components may accordingly communicate information via the network 122. In the following paragraphs, each of the system components is described.

The network 122 may include wired or wireless, and may have configurations including a star configuration, token ring configuration, or other configurations. Furthermore, the network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols.

In some embodiments, the network 122 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, etc. The network 122 may enable communication via a standard-based protocol such as smart energy profile (SEP), Echonet Lite, OpenADR, or another suitable protocol (e.g., wireless fidelity (Wi-Fi), ZigBee, HomePlug Green, etc.).

In the CPP DR system 100, the utility 104 may distribute energy (e.g., electricity) to the sites 113 and non-CPP site 117. The distribution of the energy by the utility 104 to the sites 113 and non-CPP site 117 is denoted in FIG. 1 at 114. In addition, the utility 104 may receive energy use data from the sites 113 and non-CPP site 117 via the network 122. For instance, the sites 113 and non-CPP site 117 may communicate energy usage data via smart meters (not shown) or similar systems.

The utility 104 may include any entity involved in production, transmission, and/or distribution of electricity. The utility 104 may be publicly owned or may be privately owned. Some examples of the utility 104 may include a power plant, an energy cooperative, and an independent system operator (ISO). The utility 104 may set or determine terms for the CPP DR event. For a CPP DR event, the utility 104 may set or determine an incentive, a time period, a duration, and energy usage curtailment, for instance.

The sites 113 and/or the non-CPP site 117 may include buildings, structures, equipment, or other objects that use energy distributed by the utility 104. The sites 113 and/or the non-CPP site 117 may include multiple types of structures ranging from private residences to large industrial factories or office buildings.

The sites 113 and/or the non-CPP site 117 may include appliances (not shown). The appliances may include any device that consumes electricity distributed by the utility 104 and/or that controls operation of a device that consumes electricity distributed by the utility 104.

The CPP participants 112 and/or the non-CPP participant 116 may include individuals, groups of individuals, or other entities, for example. The sites 113 may be associated with the CPP participants 112 and the non-CPP participant site (non-CPP site) 117 may be associated with the non-CPP participant 116. For example, a CPP participant 112A may be associated with a first site 113A and a second CPP participant 112B may be associated with a second site 113B. The CPP participants 112 may be able to adjust energy usage at the site 113 with which it is associated. For instance, in response to receipt of a CPP event notification, the CPP participants 112 may curtail energy use at one of the sites 113.

In some embodiments, the CPP participants 112 and the utility 104 may be parties to an agreement that establishes one or more terms of the CPP DR events in the CPP DR system 100. For example, the CPP participants 112 may agree to participate in a particular number of CPP DR events each year or during another designated time period. The number is referred to as event participant limit. One or more of the CPP participants 112 may agree to an individual event participant limit. For each of the CPP DR events in which the CPP participants 112 participate, the event participant limit may be reduced. The utility 104 may track the event participant limits of each the of CPP participants 112.

Accordingly, at any time, the utility 104 may be configured to calculate a remaining quota value of the event participant limit of the CPP participants 112. The remaining quota value may be the event participant limit reduced by a number of CPP DR events in which the CPP participants 112 have participated.

The CPP participants 112 may also be associated with the devices 115. The devices 115 may include any computing system that includes a processor, memory, and computing capabilities. In the illustrated embodiments, the devices 115 may be coupled to the network 122 to send and receive information such as the CPP event notifications to and from the other system components via the network 122.

Some examples of the devices may include a smart phone, desktop computer, and the like. The devices 115 may be configured to receive CPP event notifications from the utility server 106 via the network 122. The devices 115 may be uniquely or semi-uniquely associated with the CPP participants 112 such that the utility 104 may increase the possibility that the CPP event notification is viewed by the CPP participant 112 after it is communicated.

The site 113 and/or the device 115 may be configured to communicate statistics with the utility server 106 via the network 122. As mentioned above, energy usage data may be communicated to the utility server 106. In addition, curtailment amounts as well as other data indicative of CPP participant behavior may be communicated to the utility server 106.

The energy market server 124 may include a hardware server that includes a processor, memory, and communication capabilities. In the illustrated embodiments, the energy market server 124 may be coupled to the network 122 to send and receive information related to energy prices and energy loads with the utility server 106 via the network 122.

In some embodiments, the utility server 106 may communicate one or more energy bids to the energy market server 124. The energy bid may include one or more day-ahead demands and one or more day-ahead prices. In addition, the energy market server 124 may communicate day-ahead market results to the utility server 106. The day-ahead market results may include a clearing price and clearing demand quantity.

Although not shown in FIG. 1, it may be appreciated with the benefit of this disclosure that the energy market server 124 may be communicatively coupled to multiple utilities. The day-ahead market results may be based on energy bids received from the utilities.

The utility server 106 may include a hardware server that includes a processor, memory, and communication capabilities. In the illustrated embodiments, the utility server 106 may be coupled to the network 122 to send and receive data and information to and from one or more of the other system components via the network 122.

The utility server 106 may include a DR event module 108 and a bid module 110. The DR event module 108 may be configured to perform CPP participant selection assessments as described elsewhere herein. The bid module 110 may be configured to generate energy bids and evaluate the energy bids based in part on the CPP participant selection assessments.

Figure 4:
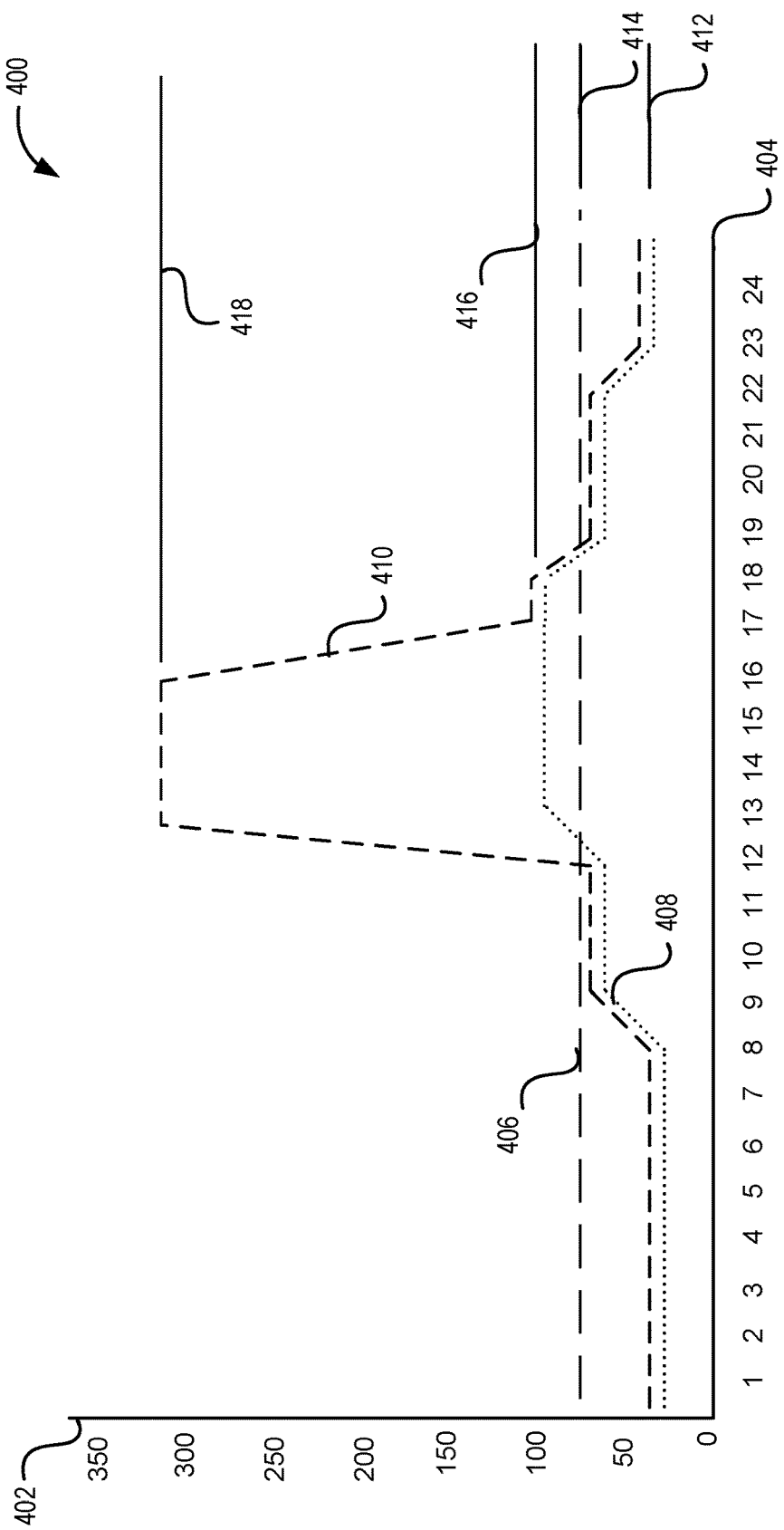
FIG. 4 is an energy price graph that depicts an example CPP rate structure that may be implemented in the CPP DR system of FIG. 1.

In the CPP DR system 100, the CPP participant selection assessments and the energy bids may be based on a CPP rate structure. Referring to FIG. 4, an example energy price graph 400 that depicts an example CPP rate structure that may be implemented in the CPP DR system of FIG. 1. In the graph 400, a Y-axis 402 may represent an energy price with units as price per energy (e.g., $/MWh). An X-axis 404 may represent time periods with units in hours. The graph 400 includes three lines 406, 408, and 410. The first line 406 plots a flat rate price. The second line 408 represents a non-critical period CPP price that may occur on days with a high load period (e.g., from 1300 hour to 1800 hours in FIG. 4) but not a critical period. The third line 410 represents a critical period price that may be implemented during days that include a critical period (e.g., from 1300 hour to 1700 hours in FIG. 4) during the high load period.

In addition, the graph 400 includes four prices 412, 414, 416, and 418. The first price 412 is the off-peak price. The second price 414 is a mid-peak price. The third price 416 is an on-peak price. The fourth price is the critical-peak price. Accordingly, the flat rate price represented by the first line 406 may maintain the mid-peak price. The non-critical period CPP price, represented by the second line 408 transitions from the off-peak price to the mid-peak price, then to the on-peak price, back to the mid-peak price and to the off-peak price. The critical period price represented by the third line 410 transitions from the off-peak price to the mid-peak price, then to the critical-peak price, then to the on-peak price, then back to the mid-peak price, and to the off-peak price. The values of the critical period price, the flat rate price, and the non-critical period CPP price are used during the CPP participant selection assessments and the energy bids. In techniques described herein, it is assumed that the critical period price, the flat rate price, and the non-critical period CPP price are predefined.

Referring back to FIG. 1, the CPP participant selection assessments may be based on annual utility profit expressions. In the embodiments described herein, multiple annual utility profit expressions may be applicable in the CPP DR system 100. Which of the annual utility profit expressions is applicable may be based on (1) whether the CPP event notifications are broadcast by the utility server 106 to the CPP participants 112, (2) whether curtailment behaviors of the CPP participants 112 is a factor in load estimations during the CPP DR event, and (3) whether the DR event module 108 communicates with the bid module 110 (e.g., whether DR assessments performed by the DR event module 108 consider one or more energy market condition factors).

All the annual utility profit expressions may be based on a first set of annual utility profit expressions. The first set of annual utility profit expressions may be implemented when the CPP event notifications are unicast, the curtailment behaviors of the CPP participants 112 are a factor in load estimations, and the DR event module 108 communicates or does not communicate with the bid module 110.

In some embodiments, the first set of annual utility profit expressions may include:

$$\max_{\{c_{id}\}} \sum_{d=1}^{d=365} \sum_{h=h_s}^{h=h_e} P(d, h, c_{id});$$

$$\text{s.t.} \sum_{d=1}^{d=365} c_{id} \leq C_M \; \forall \; i;$$

where:

$P(d,h) = -p_{DA_{dh}} \cdot L_{DA_{dh}} + p_A \cdot L_{R_{dh}} + p_l \cdot \Sigma_i L_{idh} + (p_h - p_l) \cdot \Sigma_i (c_{id} \cdot L_{idh}) - p_{RT_{dh}} \cdot (L_{R_{dh}} + \Sigma_i L_{idh} - L_{DA_{dh}}) + (p_{RT_{dh}} \cdot p_h) \cdot (\Sigma_i c_{id} \cdot L\Delta_{idh}).$ In the first set of annual utility profit expressions, an operator max is a maximizing function. The variable i represents an indexing variable for the CPP participants 112. The variables $c_{id}$ represents a decision variable that is indicative of whether one of the CPP participants 112 indicated by the indexing variable (i) for a day (d). The decision variable is a binary variable (1 or 0). The parameter $C_M$ represents the event participant limit. The function P(d, h, $c_{id}$) represents profit at a day (d), an hour (h), given decisions of the CPP participants ($c_{id}$). The parameter $p_{AD_{dh}}$ represents day-ahead price at a day (d) an hour (h). The parameter $p_{RT_{dh}}$ represents a real-time price at a day (d) and an hour (h). The parameter h represents an indexing variable of the hour to be considered during a CPP DR event. The indexing variable includes a range of a start hour $h_s$ until an ending hour $h_e$. The parameters $p_A$ represent the flat rate price for the load from the non-CPP participant 116 (e.g. the flat rate price in FIG. 4). The parameters $p_l$ represent the non-critical period CPP price (e.g., non-critical period CPP price in FIG. 4). The parameters $p_h$ represent a critical period price (e.g., the critical period price in FIG. 4). The parameters $L_{DA_{dh}}$ represent a day-ahead demand at a day (d) and an hour (h). The parameters $L_{R_{dh}}$ represent an average load at a day (d) and an hour (h) from the non-CPP participant 116. The parameters $L_{idh}$ represents regular load of CPP participant i at day d hour h when a CPP DR event is not called by the utility 104. The parameters $L\Delta_{idh}$ represents load curtailment of one of the CPP participants 112 represented by the indexing variable (i) at a day (d) and an hour (h) when a CPP DR event is called. Below physical meanings of parameters in P(d, h) are described.

The parameters $-p_{DA_{dh}} \cdot L_{DA_{dh}}$ represent a cost of the utility 104 to purchase energy in a day-ahead market. The parameters $p_A \cdot L_{R_{dh}}$ represent revenue received from the non-CPP participant 116. The parameters $p_l \cdot \Sigma_i L_{idh} + (p_h - p_l) \cdot \Sigma_i (c_{id} \cdot L_{idh})$ represent revenue received from the CPP participants 112 without considering an effect of curtailment by the CPP participants 112. The parameters $-p_{RT_{dh}} \cdot (L_{R_{dh}} + \Sigma_i L_{idh} - L_{DA_{dh}})$ a cost (or revenue) for the utility 104 to purchase or sell energy in response to a difference in the day-ahead demand and real-time demand without considering the effect of curtailment. The parameters $(p_{RT_{dh}} \cdot p_h) \cdot (\Sigma_i c_{id} \cdot L\Delta_{idh})$ represent a net revenue considering the effect of curtailment when a CPP participant 112 is called. The net revenue is for the utility 104 to sell curtailed energy in the real-time market minus the revenue contributed by the CPP participant 112 under the critical period price ($p_h$).

Furthermore, in these embodiments (implementing the first set of annual utility profits expressions), the utility server 106 may be configured to perform the CPP participant selection 114 assessment and to generate energy bids.

For example, the DR event module 108 may perform an initial CPP participant selection assessment (initial assessment). The DR event module 108 may generate an initial CPP participant selection and an estimated CPP curtailment based on the initial assessment. Based on the initial CPP participant selection, the bid module 110 may calculate a reduced day-ahead demand. The reduced day-ahead demand may be a portion of the estimated CPP curtailment. The bid module 110 may evaluate the reduced day-ahead demand to ensure that reductions in energy use by the CPP participants 112 of the initial CPP participant selection (e.g., the CPP participant selection 114) do not frustrate efficiencies introduced through the estimated CPP curtailment.

The bid module 110 may submit an energy bid to the energy market server 124. The energy bid may include a day-ahead demand and a day-ahead price based on the reduced day-ahead demand. The bid module 110 may receive day-ahead market results from the energy market server 124. The bid module 110 may then forecast a revised real time price based on day-ahead market results received from the energy market server 124.

The DR event module 108 may perform a final CPP participation selection assessment (final assessment), generate a final CPP participant selection (e.g., the CPP participant selection 114) to include the CPP participants 112 having accumulated individual participant revenue effects up to the reduced day-ahead demand. The DR event module 108 may then communicate a CPP event notification to each of the CPP participants in the final CPP participant selection 114. The CPP event notification is configured to prompt adjustment of loads by the CPP participants 112.

In some embodiments, a second set of annual utility profits expressions may be implemented. For example, the second set of annual utility profits expressions may be implemented in embodiments in which the utility 104 broadcasts the CPP event notifications to all of the CPP participants 112 and the utility 104 does not consider curtailment behavior of the CPP participants 112 as a factor in load estimations during the CPP DR event. Additionally, the second set of annual utility profits expressions may be implemented in embodiments in which the utility unicasts the CPP event notifications and the curtailment behavior of the CPP participants 112 are not factors in load estimations during the CPP DR events.

In these and other embodiments, the second set of annual utility profits may be defined according to a second set of annual utility profit expressions:

$$\max_{(\{c_d\})} \sum_{d=1}^{d=365} \sum_{h=h_s}^{h=h_e} c_d \cdot p_{RT_{dh}};$$

and $$\text{s.t.} \sum_{d=1}^{d=365} c_d \leq C_M.$$

In the second set of annual utility profit expressions, $c_d$ represents the decision variable for all the CPP participants 112. The remaining parameters are as described above.

In these embodiments (implementing the second set of annual utility profit expressions), the utility server 106 may be configured to perform the CPP participant selection 114 assessment and to generate energy bids.

For example, the DR event module 108 may be configured to calculate price sums during the CPP DR event period for each day from a particular day to an end of the year based on historical data from a previous year. Although the example of the year is provided, other designated time periods may be used to calculate price sums.

The DR event module 108 may sort the calculated price sums in descending order and calculate a remaining quota value of the event participation limit. The DR event module 108 may set a participation threshold as the value of the price sum that occupies a position in the sorted price sums that corresponds to the remaining quota value. The DR event module 108 may determine whether a real-time price for the CPP DR event period is greater than the participation threshold. In response to the real-time price being greater than the participation threshold, the DR event module 108 may broadcast CPP event notifications to the CPP participants 112.

In some embodiments, a third set of annual utility profits expressions may be implemented. For example, the third set of annual utility profits expressions may be implemented in embodiments in which the utility 104 broadcasts the CPP event notifications to all of the CPP participants 112 and the utility 104 considers curtailment behavior of the CPP participants 112 as a factor in load estimations during the CPP DR event.

In these and other embodiments, the third set of annual utility profits may be defined according to a second set of annual utility profit expressions:

$$\max_{(\{c_d\})} \sum_{d=1}^{d=365} c_d \cdot \sum_{h=h_s}^{h=h_e} \left[ (p_h - p_l) \cdot \sum_i (L_{idh}) + p_{RT_{dh}} - p_h \right) \cdot \left( \sum_i L\Delta_{idh} \right) \right];$$

and $$\text{s.t.} \sum_{d=1}^{d=365} c_d \leq C_M.$$

In the third set of annual utility profit expressions, the parameters are as described above.

In these embodiments (implementing the third set of annual utility profit expressions), the utility server 106 may be configured to perform the CPP participant selection assessment and to generate energy bids.

For example, the DR event module 108 may be configured to calculate curtailment revenues for each day from a particular day until a final day of the year based on historical data from a previous year. Although the example of the year is provided, other designated time periods may be used to calculate curtailment revenues.

The DR event module 108 may sort the calculated curtailment revenues in descending order. The DR event module 108 may calculate a remaining quota value of an event participation limit. The DR event module 108 may set a participation threshold as the value of the curtailment revenue that occupies a position in the sorted calculated curtailment revenues that corresponds to the remaining quota value. The DR event module 108 may determine whether a calculated curtailment revenue for a particular day is greater than the participation threshold. In response to the calculated curtailment revenue being greater than the participation threshold, the DR event module 108 may broadcast CPP event notifications to the CPP participants 112.

The curtailment revenues may be calculated according to a curtailment revenue expression:

$$O(d) = \sum_{h=h_s}^{h=h_e} \left[ (p_h - p_l) \cdot \sum_i (L_{idh}) + (p_{RT_{dh}} - p_h) \cdot \left( \sum_i L\Delta_{idh} \right) \right].$$

In the curtailment revenue expression, the function $O(d)$ represents the curtailment revenue for a day (d). The remaining parameters of curtailment revenue expression are as described above.

The DR event module 108 and the bid module 110 may be implemented using hardware including a processor, a microprocessor (e.g., to perform or control performance of one or more operations), a field-programmable gate array (FPGA), or an application-specific integrated circuit (ASIC). In some other instances, the DR event module 108 and the bid module 110 may be implemented using a combination of hardware and software. Implementation in software may include rapid activation and deactivation of one or more transistors or transistor elements such as may be included in hardware of a computing system. Additionally, software defined instructions may operate on information within transistor elements. Implementation of software instructions may at least temporarily reconfigure electronic pathways and transform computing hardware.

In the CPP DR system 100, memory such as memory in the devices 115, the sites 113, the non-CPP site 117, the energy market server 124, and the utility server 106 may include memory 508 described with reference to FIG. 5 below.

Modifications, additions, or omissions may be made to the CPP DR system 100 without departing from the scope of the present disclosure. Specifically, the present disclosure applies to CPP DR systems that include one or more of the CPP participants 112, one or more of the sites 113, one or more utilities 104, one or more utility servers 106, one or more devices 115, one or more non-CCP participants 116, or any combination thereof. Moreover, the separation of the system components in the embodiments described herein is not meant to indicate that the separation occurs in all embodiments. Moreover, it may be understood with the benefit of this disclosure that the described components may be integrated together in a single component or separated into multiple components.

Figure 2:
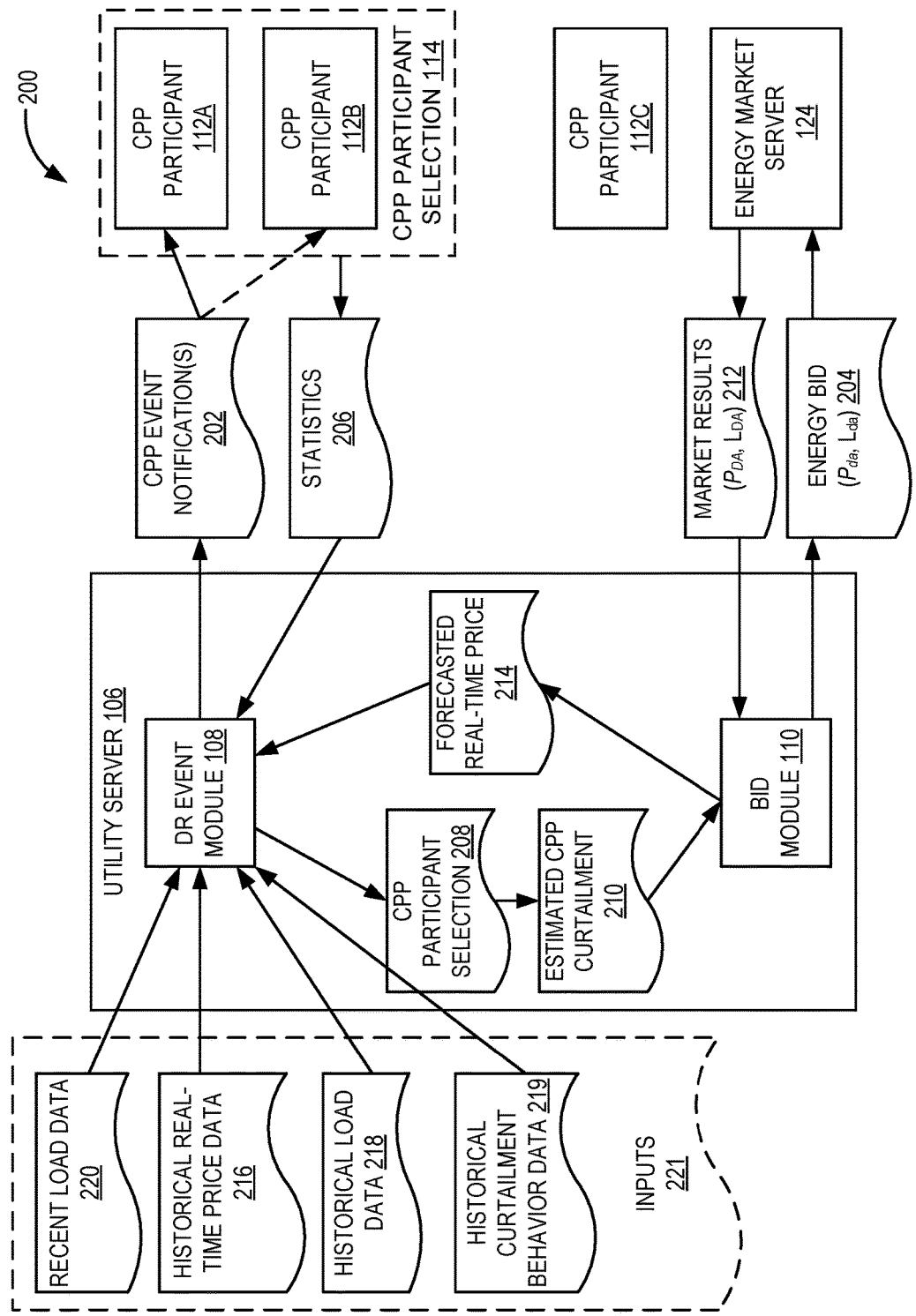
FIG. 2 is a block diagram of an example CPP DR event implementation process that may be implemented in the CPP DR system of FIG. 1.

FIG. 2 is a block diagram of an example CPP DR event implementation process (process) 200 that may be implemented in the CPP DR system 100 of FIG. 1. FIG. 2 depicts the utility server 106, the DR event module 108, the bid module 110, the CPP participants 112, and the CPP participant selection 114 described with reference to FIG. 1. Although not explicitly depicted, information and data may be communicated via a network such as the network 122 of FIG. 1.

The process 200 of FIG. 2 may be implemented in embodiments in which the CPP event notifications 202 are unicast, the curtailment behaviors of the CPP participants 112 are a factor in load estimations, and the DR event module 108 communicates with the bid module 110. FIG. 2 depicts the utility server 106, the DR event module 108, the bid module 110, the CPP participants 112, and the CPP participant selection 114 described with reference to FIG. 1. Although not explicitly depicted, information and data may be communicated via a network such as the network 122 of FIG. 1.

The process 200 depicted in FIG. 2 considers the event participation limits of the CPP participants 112. Additionally, the process 200 is based on a profit analysis over the course of a year. Accordingly, at the beginning of the year or at the beginning of another designated time period, the event participation limits may be set to an initial value. In the embodiments described herein the event participation limit may operate as a maximum value that is reduced when the CPP participant 112 associated therewith participates in a CPP DR event. For instance, the event participation limit for a first CPP participant 112A may be twelve. In response to participation of the first CPP participant 112A in a CPP DR event on January 15, the DR event module 108 may reduce the event participation limit to eleven. The reduced event participation limit may be referred to as the remaining quota value.

Although the embodiments described in this disclosure are based on analysis over a year, other designated time periods may be appropriate. For instance, the CPP participants 112 may enter into agreements quarterly or for several years.

The process 200 may be performed for a particular day and time during which the CPP DR event is to occur. The particular day is one of the days during the year or during the designated time period. The process 200 may include one or more operations that are conducted prior to the particular day. For instance, in some embodiments, the process 200 or portions thereof are performed prior to the particular day, which may enable the CPP participants 112 to receive the CPP event notifications 202 and to adjust loads accordingly. In addition, the energy market server 124 may operate according to deadlines that occur prior to the particular day. For instance, day-ahead bidding may have a submission deadline (e.g., by 12:00 PM a day-ahead of the particular day). In addition, the energy market server 124 may publish clearance announcements at a particular time (e.g., by 4:00 PM a day-ahead of the particular day) and/or agreements with the CPP participants 112 may dictate that CPP event notifications 202 are communicated by a notification deadline (e.g., 6:00 PM a day-ahead of the particular day).

In the process 200 depicted in FIG. 2, the DR event module 108 may be configured to perform an initial assessment. The initial assessment is performed for the particular day on which the CPP DR event is to occur. The initial assessment may be based on inputs 221. The inputs 221 may include recent load data 220, historical real-time price data 216, historical load data 218, other types of data, or some combination thereof. The recent load data 220, the historical real-time price data 216, historical curtailment behavior data 219, the historical load data 218, may be received from a third party or may accessed from a database maintained or accessible by the utility server 106.

In the process 200, the initial assessment may include estimating a long-term price and a long-term load. The long-term price and the long-term load may be based on one or more of the inputs 221 such as the historical real-time price data 216 and the historical load data 218. The long-term price and the long-term load may be estimated for a "long-term" period such as a month, a season, or another period of time. In some embodiments, the long-term price and the long-term load may be based on historical data from a previous year or another previous designated time period.

Additionally or alternatively, in some embodiments, the long-term price and the long-term load may be based on the clustered values from historical load data from all the CPP participants 112 into K clusters according to K-mean clustering techniques. For each of the CPP participants 112, a nearest cluster may be found and a mean of the nearest cluster is used for the estimated long-term price and the estimated long-term load.

The initial assessment may include estimating a short-term price and short-term load. The DR event module 108 may estimate the short-term price and the short-term load based on one or more of the inputs 221. The DR event module 108 may implement machine learning methods such as regression or neural networks to estimate the short-term price and the short-term load.

The initial assessment may include training an empirical curtailment model for each of the CPP participants 112. In some embodiments, the empirical curtailment model is defined by a curtailment model expression:

$$L\Delta_{idh} = k \cdot L_{idh}.$$

As described above, in the curtailment model expression, the parameter $L\Delta_{idh}$ represents a load curtailment of one of the CPP participants indicated by the indexing variable i at a day and an hour during the CPP DR event and $L_{idh}$ represents a regular load of a CPP participant (i) at a day (d) and an hour (h) when the CPP DR event is called. The parameter k represents a constant factor. The values used in the curtailment model expression may be based on the estimated long term load, the estimated long term price, estimated short term load, estimated short term price, one or more of the inputs 221, or some combination thereof.

The initial assessment may include calculating individual participant revenue effect for each of the CPP participants 112 from a particular day until a final day of the year. Although an example of the year is provided, other designated time periods may be used in individual participant revenue effect calculations.

The individual participant revenue effect may be based on the estimated long-term price, the estimated long-term load, the estimated short-term price, the estimated short-term load, one or more of the inputs 221, the empirical curtailment model, or some combination thereof.

For instance, the individual participant revenue effect may be based on the historical real-time price data 216, the historical load data 218, and the historical curtailment behavior data 219. The individual participant revenue effect may represent a difference between a total revenue obtained by a utility (e.g., the utility 104 of FIG. 1) when one of the CPP participants 112 is included in the CPP participant selection 114 and a total revenue obtained by the utility when the CPP participants is not included in the CPP participant selection 114.

In some embodiments, the individual participant revenue effect may be calculated according to individual participant revenue effect expressions:

$$\max_{\{c_{id}\}} \sum_{d=1}^{d=365} c_{id} \cdot [E_i(d)];$$

$$\text{s.t.} \sum_{d=1}^{d=365} c_{id} \leq C_M \; \forall \; i; \text{ and}$$

$$\text{where } E_i(d) = (p_h - p_l) \cdot \sum_{h=h_s}^{h=h_e} L_{idh} + \sum_{h=h_s}^{h=h_e} (p_{RT_{dh}} - p_h) \cdot L\Delta_{idh}.$$

In the individual participant revenue effect expressions, $E_i(d)$ represents an individual participant revenue effect of one of the CPP participants 112 identified by indexing variable (i) for a day (d). The remaining parameters are as described above. The individual participant revenue effect expressions use a greedy algorithm to select a maximum event participant limit ($C_M$) of the individual participant revenue effect within the year or another designated time period.

The DR event module 108 may sort the individual participant revenue effect in decreasing order for each of the CPP participants 112. The DR event module 108 may set participant revenue thresholds for each of the CPP participants as the value of the individual participant revenue effect that occupies a position in the sorted individual participant revenue effect that corresponds to the event participation limit or the remaining quota value of the CPP participant 112. For instance, if the event participation limit or the remaining quota value for the first CPP participant 112A is five, then the participation revenue threshold for the first CPP participant 112A is the fifth individual participant evaluation criterion in the sorted individual participant revenue effect. In circumstances in which the event participation limit or the remaining quota value is equal to zero, the participation revenue threshold is set to an infinite value.

The DR event module 108 may compare each of the individual participant revenue effect of each of the CPP participants 112 to the participant revenue threshold of the CPP participant 112. In response to the individual participant revenue effect of the CPP participant 112 being greater than the participant revenue threshold of the CPP participant 112, the DR event module 108 includes the CPP participant 112 in the CPP participant selection 114. In response to the individual participant revenue effect of the CPP participant 112 being less than the participant revenue threshold of the CPP participant 112, the DR event module 108 does not include the CPP participant 112 in the CPP participant selection 114.

Referring to the individual participant revenue effect expressions above, when the CPP participant 112 is included in the CPP participant selection 114, the decision variable ($c_{id}$) for the CPP participant 112 is set to one and when the CPP participant 112 is not included in the CPP participant selection 114, the decision variable for the CPP participant 112 is set to zero.

The process 200 of FIG. 2 may include generating an initial CPP participant selection 208 that may correspond to the CPP participant selection 114. In addition, the DR event module 108 may generate an estimated CPP curtailment 210 based on the initial CPP participant selection 208 and one or more of the inputs 221. The CPP participant selection 208 and the estimated CPP curtailment 210 may be communicated to the bid module 110.

The bid module 110 may be configured to calculate a reduced day-ahead demand. The reduced day-ahead demand may be a portion of the estimated CPP curtailment 210. For example, the reduced day-ahead demand may include a sum of products of decision variables and load curtailments of the CPP participants 112 multiplied by a reduction coefficient $\delta_h$.

The bid module 110 may be configured to evaluate the reduced day-ahead demand. Evaluation of the reduced day-ahead demand may ensure that reductions in energy use by the CPP participants 112 of the initial CPP participant selection 208 do not frustrate efficiencies introduced through the estimated CPP curtailment 210.

Evaluation of the reduced day-ahead demand may evaluate differences in profit (e.g., according to the function $P(d, h, [c_{id}])$) after and before considering the effect of reduced day-ahead demand. For example, evaluation may ensure $P(d, h, [c_{id}])_r - P(d, h, [c_{id}])_o \geq 0$, in which 'r' subscript represents 'reduced' and 'o' subscript and 'non-reduced' DA load.

In some embodiments, evaluation of the reduced day-ahead demand may include one or more operations. For instance, the bid module 110 may determine whether a real-time price at a day and an hour when the CPP DR event is called is less than a reduced day-ahead price at the day and the hour. In response to the real-time price being less than the reduced real-time price, the bid module 110 may set the reduction coefficient to one and the reduce day-ahead demand to a sum of the products of decision variables and load curtailments of the CPP participants 112 at the day and the hour when the CPP DR event is called. In response to the real-time price being greater than the reduced day-ahead price, the bid module 110 may set the reduced day-ahead demand based on a reduced day-ahead demand inequality and a reduced DA demand expression.

In some embodiments the reduced day-ahead demand inequality includes:

$$\frac{p_{DA_{dh}} - p_{DA_{dh_r}}}{p_{RT_{dh}} - p_{DA_{dh_r}}} \geq \frac{\delta_h \cdot \sum_i c_{id} \cdot L\Delta_{idh}}{L_{DA_{dh}}}$$

The reduced DA demand expressions may include:

$$\delta_h \cdot \Sigma_i c_{id} \cdot L\Delta_{idh}; \text{ and}$$

$$0 \leq \delta_h \leq 1.$$

In the reduced day-ahead demand inequality, the $$p_{DA_{dh_r}}$$

represents the reduced day-ahead price and the remaining parameters are as described above.

The bid module may submit a reduced energy bid 204 to the energy market server 124. The reduced energy bid may include a day-ahead demand and a day-ahead price based on the reduced day-ahead demand. The energy market server 124 may publish market results 212 to the bid module 110. Based on the market results 212, the bid module 110 may forecast a revised real time price 214. The revised real time price 214 may be forecasted according to one or more forecasting techniques. For instance, in some embodiments, the bid module 110 may be configured to forecast the revised real time price 214 as described in one or more of U.S. patent Ser. Nos. 14/701,448, 14/797,710, 14/873,061, and 14/673,575, which are incorporated herein by reference in their entireties. The bid module 110 may communicate the forecasted real-time price 214 to the DR event module 108.

The DR event module 108 may be configured to perform a final assessment. The final assessment may be similar to the initial CPP participation selection assessment except in that the final assessment takes into consideration the forecasted real-time price 214.

For example, the final assessment may include re-calculating individual participant revenue effect revenue effect for each of the CPP participants based on the forecasted revised real time price 214 from the particular day x until a final day of a year. Although an example of the year is provided, other designated time periods may be used in the final assessment.

For example, during the final CPP participation selection 114, the individual participant revenue effect expressions may be modified to include:

$$\max_{(\{c_{id}\})} \sum_{d=x}^{d=365} c_{id} \cdot [E_i(d)];$$

$$\text{s.t.} \sum_{d=x}^{d=365} c_{id} \leq C_M \forall i; \text{ and}$$

where $E_i(d) = (p_h - p_l) \cdot \sum_{h=h_s}^{h=h_e} L_{idh} + \sum_{h=h_s}^{h=h_e} (p_{RT_{dh\_Forecasted}} - p_h) \cdot L\Delta_{idh}.$ In the modified individual participant revenue effect expressions, $$p_{RT_{dh\_Forecasted}}$$

represents the forecasted revised real time price 214 and the remaining parameters are as described above.

The DR event module 108 may sort the recalculated individual participant revenue effect in decreasing order for each of the CPP participants 112 and set the participant revenue thresholds for each of the CPP participants 112 as the value of the individual participant revenue effect that occupies a position in the sorted individual participant revenue effect that corresponds to the event participation limit or the remaining quota value of the CPP participant 112. The DR event module 108 may calculate accumulated CPP curtailments from the sorted individual participant revenue effects and compare the accumulated CPP curtailments with the reduced day-ahead demand.

In some embodiments, the long-term price, the long-term load, the short-term price, and the short-term load may be re-estimated. Additionally or alternatively, the empirical curtailment model may be re-trained.

The DR event module 108 may generate a final CPP participant selection (e.g., the CPP participant selection 114) to include the CPP participants 112 having accumulated individual participant revenue effects up to the reduced day-ahead demand.

The DR event module 108 may communicate a CPP event notification 202 to each of the CPP participants 112 that are included in the final CPP participant selection 114. The CPP event notifications 202 are configured to prompt adjustment of loads by the CPP participants 112. The CPP participants 112 may communicate statistics 206 to the DR event module 108. The statistics 206 may be used by the DR event module 108 in subsequent processes 200.

The process 200 of FIG. 2 may be modified based on whether the CPP event notifications 202 are unicast or broadcast, the curtailment behaviors of the CPP participants 112 are or are not a factor in load estimations, and the DR event module 108 communicates or does not communicate with the bid module 110.

For example, in embodiments in which the CPP event notifications 202 are unicast, the curtailment behaviors of the CPP participants 112 are a factor in load estimations, and the DR event module 108 does not communicate with the bid module 110, the DR event module 108 may perform a first modified process.

In the first modified process, the DR event module 108 may estimate a long-term price, a long-term load, a short-term price, and short-term load for each of the CPP participants 112 as described above. Additionally, the DR event module 108 may train an empirical curtailment model for each of the CPP participants 112.

The DR event module 108 may calculate individual participant evaluation criteria for each of the CPP participants 112 from a particular day until a final day of the year based on a real time price forecasted as described above. Although an example of the year is provided, other designated time periods may be used in the individual participant evaluation criteria calculations.

In some embodiments, the individual participant evaluation criteria are based on individual participant evaluation criteria expressions:

$$\max_{(\{c_{id}\})} \sum_{d=1}^{d=365} c_{id} \cdot [E_i(d)];$$

$$\text{s.t. } \sum_{d=1}^{d=365} c_{id} \leq C_M \ \forall \ i; \text{ and}$$

$$E_i(d) = (p_h - p_l) \cdot \sum_{h=h_s}^{h=h_e} L_{idh} + \sum_{h=h_s}^{h=h_e} (p_{RT-Forcasted} - p_h) \cdot L\Delta_{idh}.$$

In the individual participant evaluation criteria expressions, the parameters are as described above.

The DR event module 108 may sort the individual participant evaluation criteria in decreasing order for each of the CPP participants 112. The DR event module 108 may set participant revenue thresholds for each of the CPP participants 112 as the value of the individual participant evaluation criteria that occupies a position in the sorted individual participant evaluation criteria that corresponds to the event participation limit or the remaining quota value of the CPP participant 112.

The DR event module 108 may compare each of the individual participant evaluation criteria of each of the CPP participants 112 to the participant revenue threshold of the CPP participant 112. In response to the individual participant evaluation criteria of the CPP participant 112 being greater than the participant revenue threshold of the CPP participant 112 the DR event module 108 may perform one or more operations. For example, the DR event module 108 may include the CPP participant 112 in the CPP participant selection 114, record inclusion of the CPP participant 112 in the CPP participant selection 114 relative to the event participation limit, and communicate the CPP event notifications 202 to each of the CPP participants 112 in the CPP participation selection 114.

In embodiments in which the CPP event notifications 202 are broadcast and the curtailment behaviors of the CPP participants 112 are a factor in load estimations, the DR event module 108 may perform a second modified process. In the second modified process, the DR event module 108 may calculate curtailment revenues for each day from a particular day until a final day of the year based on one or more of the inputs 221 such as historical data from a previous year. Although an example of the year is provided, other designated time periods may be used in the second modified process.

The DR event module 108 may sort the calculated curtailment revenues in descending order and calculate a remaining quota value of an event participation limit. The DR event module 108 may set a participation threshold as the value of the curtailment revenue that occupies a position in the sorted calculated curtailment revenues that correspond to the remaining quota value. The DR event module 108 may determine whether a calculated curtailment revenue for a particular day is greater than the participation threshold. In response to the calculated curtailment revenue being greater than the participation threshold, the DR event module 108 may broadcast the CPP event notifications 202 to the CPP participants 112.

In embodiments in which the CPP event notifications 202 are broadcast or unicast and the curtailment behaviors of the CPP participants 112 are not a factor in load estimations, the DR event module 108 may perform a third modified process. In the third modified process, the thresholds are based purely on historical prices because other parameters are treated as constants.

For example, in the third modified process, the DR event module 108 may calculate price sums during the CPP DR event period for each day from a particular day to an end of the year based on historical data from a previous year. Although an example of the year is provided, other designated time periods may be used in price sum calculations.

The DR event module 108 may sort the calculated price sums in descending order. The DR event module 108 may calculate a remaining quota value of an event participation limit and set a participation threshold as the value of the price sum that occupies a position in the sorted price sums that corresponds to the remaining quota value. The DR event module 108 may determine whether a real-time price for the CPP DR event period is greater than the participation threshold. In response to the real-time price being greater than the participation threshold, the DR event module 108 may broadcast the CPP event notifications 202 to the CPP participants 112.

Figure 3:
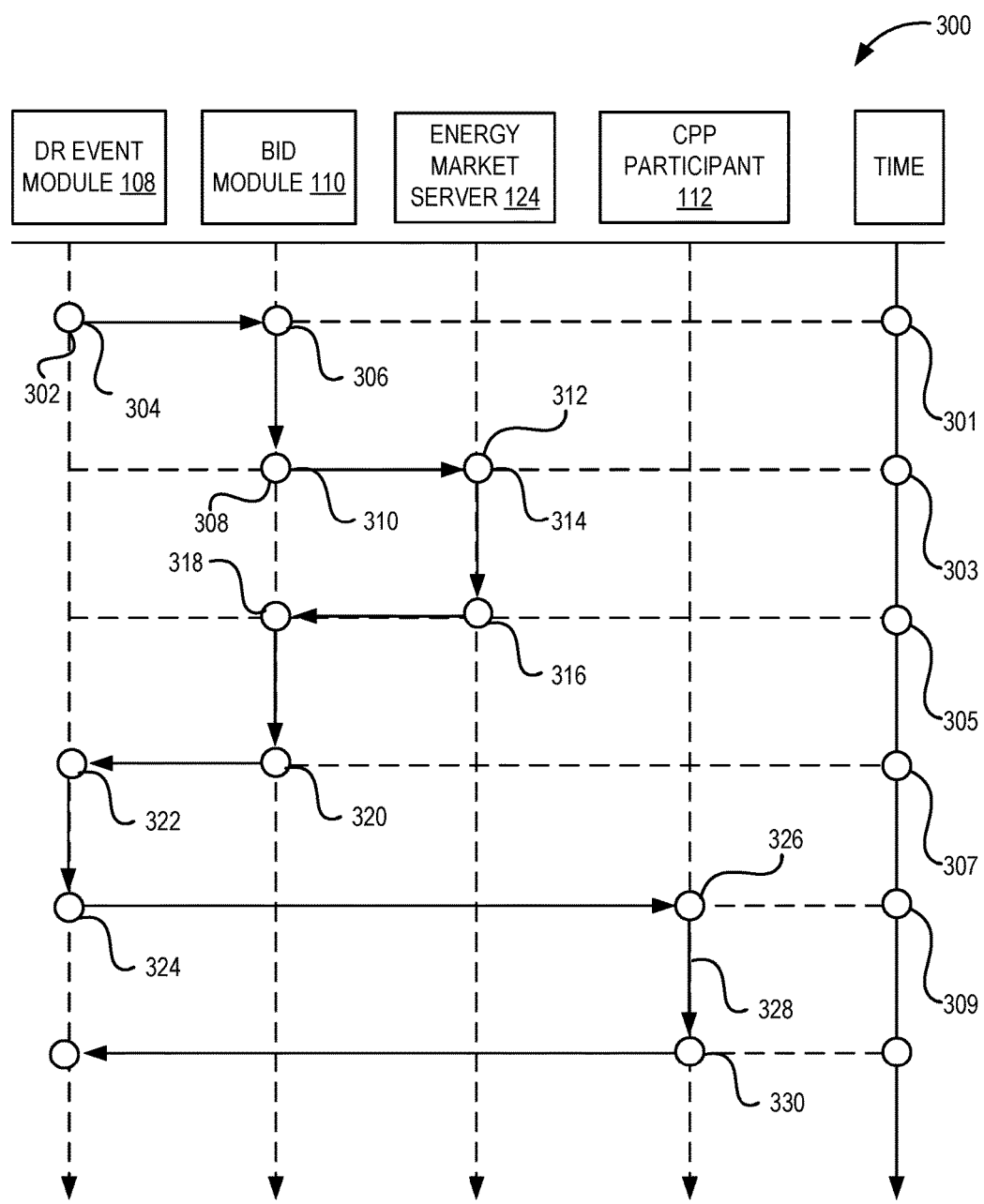
FIG. 3 depicts an example sequence of the CPP DR event implementation process that may be implemented in the CPP DR system of FIG. 1.

FIG. 3 depicts an example sequence 300 of the CPP DR event implementation process that may be implemented in the CPP DR system of FIG. 1. In the sequence 300, the DR event module 108, the bid module 110, the energy market server 124, and the CPP participant 112 described elsewhere in this disclosure are depicted. Times 301, 303, 305, 307, and 309 are included that designate when an operation (e.g., 302, 304, 306, etc.) is taken.

With combined reference to FIGS. 2 and 3, a first operation 302 may include the DR event module 108 performing an initial assessment and generation of an initial CPP participant selection 114 and an estimated CPP curtailment 210 based on initial assessment.

A second operation 304 may include the DR event module 108 communicating the initial CPP participant selection 114 and the estimated CPP curtailment 210 to the bid module 110. A third operation 306 may include the bid module 110 receiving the initial CPP participant selection 114 and the estimated CPP curtailment 210.

The first operation 302, the second operation 304, and the third operation 306 may be performed at a first time 301. The first time 301 may be some period before a day-ahead market submission deadline (e.g., 11:00 AM a day-ahead).

A fourth operation 308 may include the bid module 110 calculating a reduced day-ahead demand based on the initial CPP participant selection 114. The fourth operation 308 may include evaluating the reduced day-ahead demand to ensure that reductions in energy use by the CPP participants 112 of the initial CPP participant selection 114 do not frustrate efficiencies introduced through the estimated CPP curtailment 210. A fifth operation 310 may include the bid module 110 submitting an energy bid to the energy market server 124. The fourth operation 308 and the fifth operation 310 may be performed at a second time 303. The second time 303 may be a day-ahead market submission deadline (e.g., 12:00 PM a day-ahead).

The sixth operation 312 may include the energy market server 124 receiving the energy bid. The seventh operation 314 may include the energy market server 124 generating market results. The eighth operation 316 may include the energy market server 124 communicating the market results to the bid module 110. The ninth operation 318 may include the bid module receiving the market results and forecasting a revised real time price based on day-ahead market results received from the energy market server 124. The eighth operation 316 and the ninth operation 318 may occur at a third time 305 when the day-ahead clearance announcement is made (e.g., 4:00 PM a day-ahead).

The tenth operation 320 may include the bid module 110 communicating the forecasted revised real time price to the DR event module 108. The eleventh operation 322 may include the DR event module 108 performing a final assessment and generating a final CPP participant selection 114 to include the CPP participants 112 having accumulated individual participant revenue effects up to the reduced day-ahead demand. The tenth operation 320 and the eleventh operation 322 may occur at a fourth time 307 between the third time 305 and a fifth time 309, described below.

A twelfth operation 324 may include the DR event module 108 communicating a CPP event notification 202 to each of the CPP participants 112. A thirteenth operation 326 may include the CPP participants 112 may receive the CPP event notification 202 and adjust loads accordingly. The twelfth operation 324 and the thirteenth operation 326 may occur at the fifth time 309 prior to a CPP event notification 202 deadline (e.g., 6:00 PM a day-ahead). The fourteenth operation 328 may include the CPP participants 112 adjusting loads during a CPP DR event. The fifteenth operation 330 may include the CPP participant 112 communicating statistics to the DR event module 108.

Figure 5:
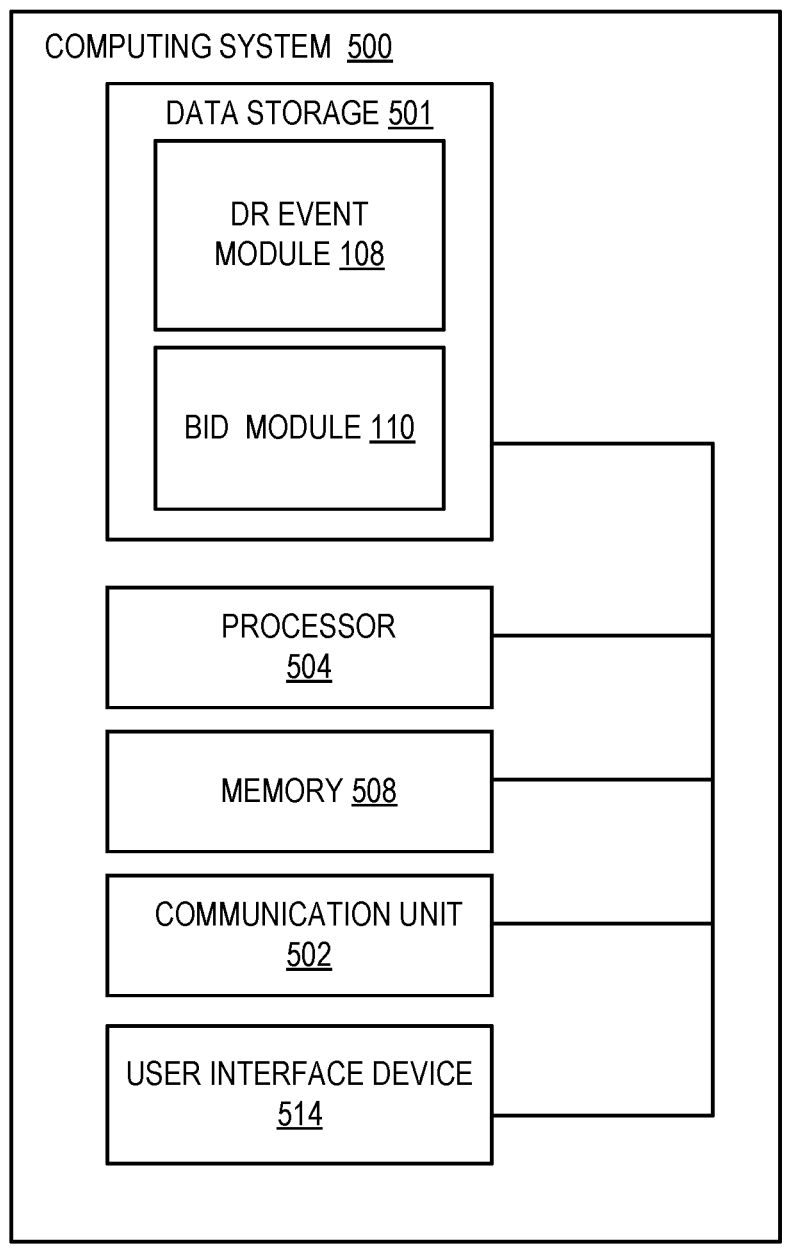
FIG. 5 is a block diagram of a computing system configured for CPP DR event implementation.

FIG. 5 illustrates an example computing system 500 configured for CPP DR event implementation. The computing system 500 may be implemented in the CPP DR system 100 of FIG. 1, for instance. Examples of the computing system 500 may include one or more of the utility server 106, the CPP participant devices 115, the sites 113, the non-CPP site 117, or the energy market server 124. The computing system 500 may include one or more processors 504, a memory 508, a communication unit 502, a user interface device 514, and a data storage 501 that includes one or both of the DR event module 108 and the bid module 110 (collectively, modules 108/110).

The processor 504 may include any suitable special-purpose or general-purpose computer, computing entity, or processing device including various computer hardware or software modules and may be configured to execute instructions stored on any applicable computer-readable storage media. For example, the processor 504 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 5, the processor 504 may more generally include any number of processors configured to perform individually or collectively any number of operations described in the present disclosure. Additionally, one or more of the processors 504 may be present on one or more different electronic devices or computing systems. In some embodiments, the processor 504 may interpret and/or execute program instructions and/or process data stored in the memory 508, the data storage 501, or the memory 508 and the data storage 501. In some embodiments, the processor 504 may fetch program instructions from the data storage 501 and load the program instructions in the memory 508. After the program instructions are loaded into the memory 508, the processor 504 may execute the program instructions.

The memory 508 and the data storage 501 may include computer-readable storage media for carrying or having computer-executable instructions or data structures stored thereon. Such computer-readable storage media may include any available media that may be accessed by a general-purpose or special-purpose computer, such as the processor 504. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 504 to perform a certain operation or group of operations.

The communication unit 502 may include one or more pieces of hardware configured to receive and send communications. In some embodiments, the communication unit 502 may include one or more of an antenna, a wired port, and modulation/demodulation hardware, among other communication hardware devices. In particular, the communication unit 502 may be configured to receive a communication from outside the computing system 500 and to present the communication to the processor 504 or to send a communication from the processor 504 to another device or network (e.g., 122 of FIG. 1).

The user interface device 514 may include one or more pieces of hardware configured to receive input from and/or provide output to a user. In some embodiments, the user interface device 514 may include one or more of a speaker, a microphone, a display, a keyboard, a touch screen, or a holographic projection, among other hardware devices.

The modules 108/110 may include program instructions stored in the data storage 501. The processor 504 may be configured to load the modules 108/110 into the memory 508 and execute the modules 108/110. Alternatively, the processor 504 may execute the modules 108/110 line-by-line from the data storage 501 without loading them into the memory 508. When executing the modules 108/110 the processor 504 may be configured to perform a CPP DR event implementation as described elsewhere in this disclosure.

Modifications, additions, or omissions may be made to the computing system 500 without departing from the scope of the present disclosure. For example, in some embodiments, the computing system 500 may not include the user interface device 514. In some embodiments, the different components of the computing system 500 may be physically separate and may be communicatively coupled via any suitable mechanism. For example, the data storage 501 may be part of a storage device that is separate from a server, which includes the processor 504, the memory 508, and the communication unit 502, that is communicatively coupled to the storage device.

Figure 6A:
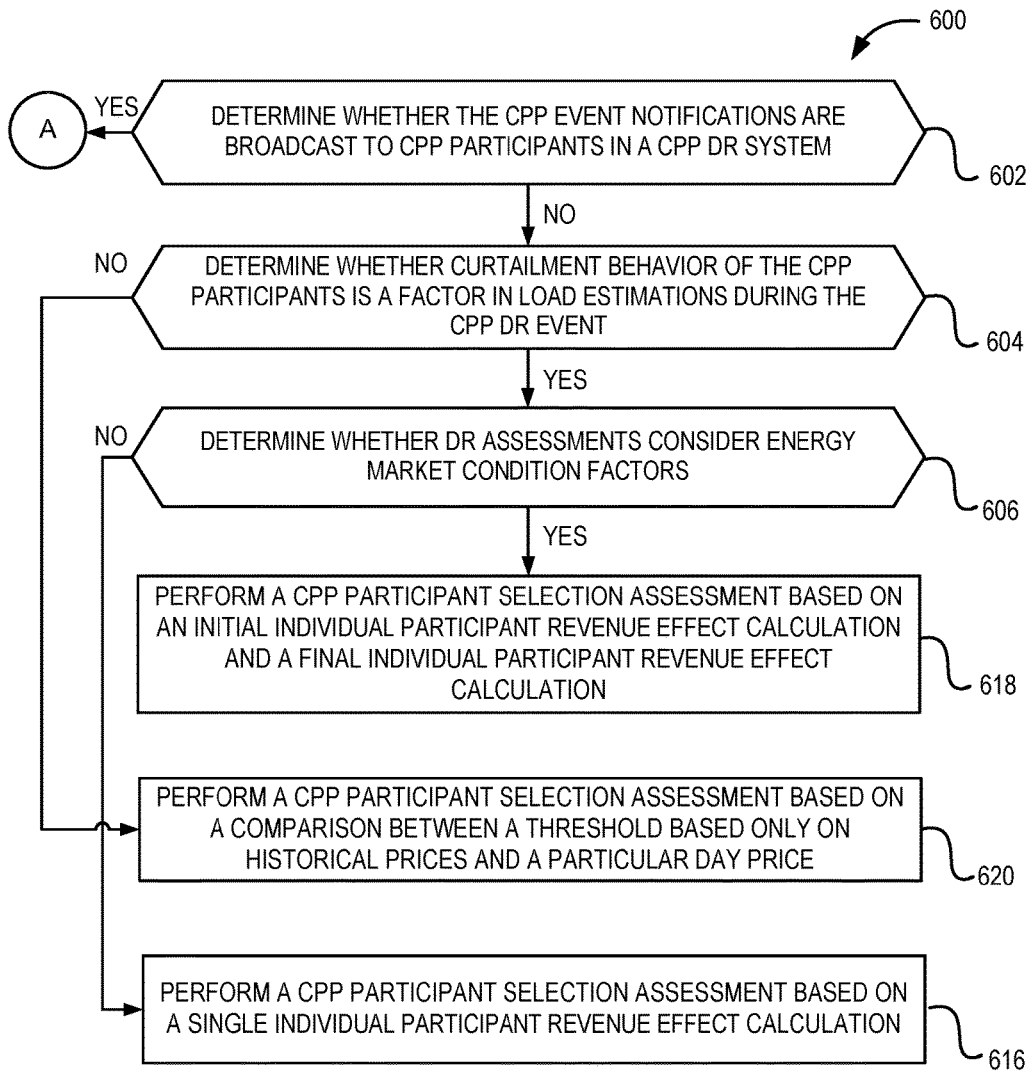
FIGS. 6A and 6B are a flow diagram of an example method of CPP DR event implementation.
Figure 6B:
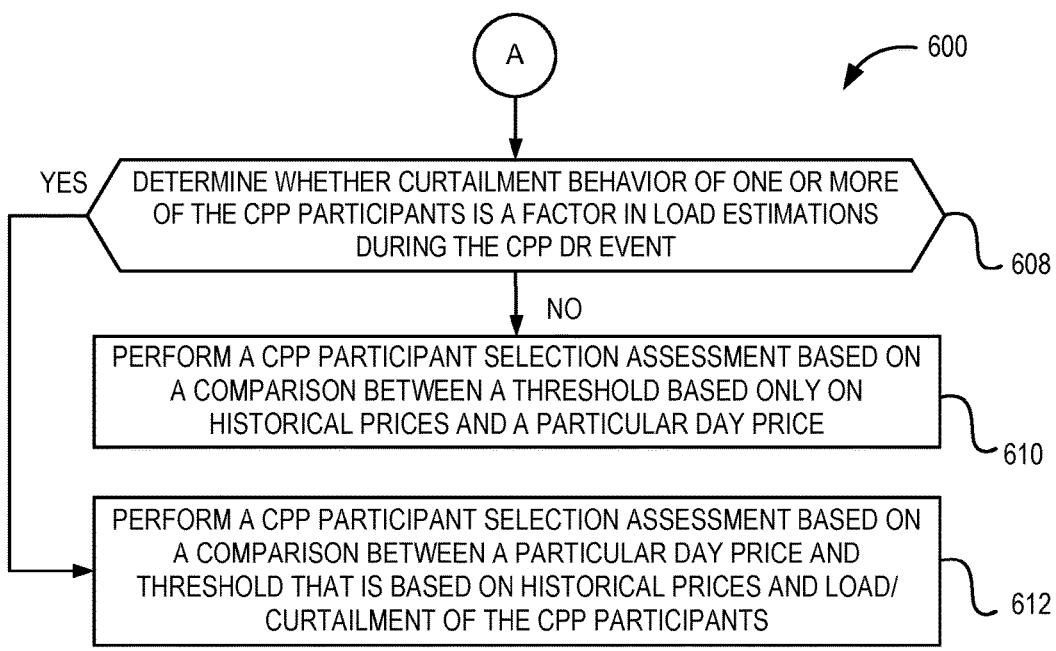

FIGS. 6A and 6B are a flow diagram of an example method 600 of CPP DR event implementation, arranged in accordance with at least one embodiment described herein. Although illustrated as discrete blocks, various blocks may be divided into additional blocks, combined into fewer blocks, or eliminated, depending on the desired implementation.

The method 600 may begin at block 602 in which it may be determined whether CPP event notifications are broadcast to CPP participants in a CPP DR system. For example, with reference to FIG. 1, it may be determined whether the utility server 106 is configured to broadcast CPP event notifications. In response to the CPP event notifications being unicast ("NO" at block 602), the method 600 may proceed to block 604. In response to the CPP event notifications being broadcast ("YES" at block 602), the method 600 may proceed to block 608 of FIG. 6B.

At block 604, it may be determined whether curtailment behavior of one or more of the CPP participants is a factor in load estimations during the CPP DR event. In response to the curtailment behavior being a factor ("YES" at block 604), the method 600 may proceed to block 606. In response to the curtailment behavior not being a factor ("NO" at block 604), the method 600 may proceed to block 620. At block 620, a CPP participant selection assessment may be performed based on a comparison between a threshold that is based only on historical prices and a particular day price.

At block 606, it may be determined whether DR assessments consider one or more energy market condition factors. In response to the DR assessments considering energy market condition factors ("YES" at block 606), the method 600 may proceed to block 618. At block 618, a CPP participant selection assessment may be performed based on an initial individual participant revenue effect calculation and a final individual participant revenue effect calculation. In response to the DR assessments not considering energy market condition factors ("NO" at block 606), the method 600 may proceed to block 616. At block 616, a CPP participant selection assessment may be performed based on a single individual participant revenue effect calculation.

With reference to FIG. 6B, at block 608, it may be determined whether curtailment behavior of one or more of the CPP participants is a factor in load estimations during the CPP DR event. In response to the curtailment behavior not being a factor ("NO" at block 608), the method 600 may proceed to block 610. At block 610, a CPP participant selection assessment may be performed based on a comparison between a threshold that is based only on historical prices and a particular day price. The CPP participant selection assessment of block 610 may be similar to the CPP participant selection assessment of block 620. In response to the curtailment behavior being a factor ("YES" at block 608), the method 600 may proceed to block 612. At block 612, a CPP participant selection assessment may be performed based on a comparison between a particular day price and threshold that is based on historical prices and load/curtailment of the CPP participants.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 7:
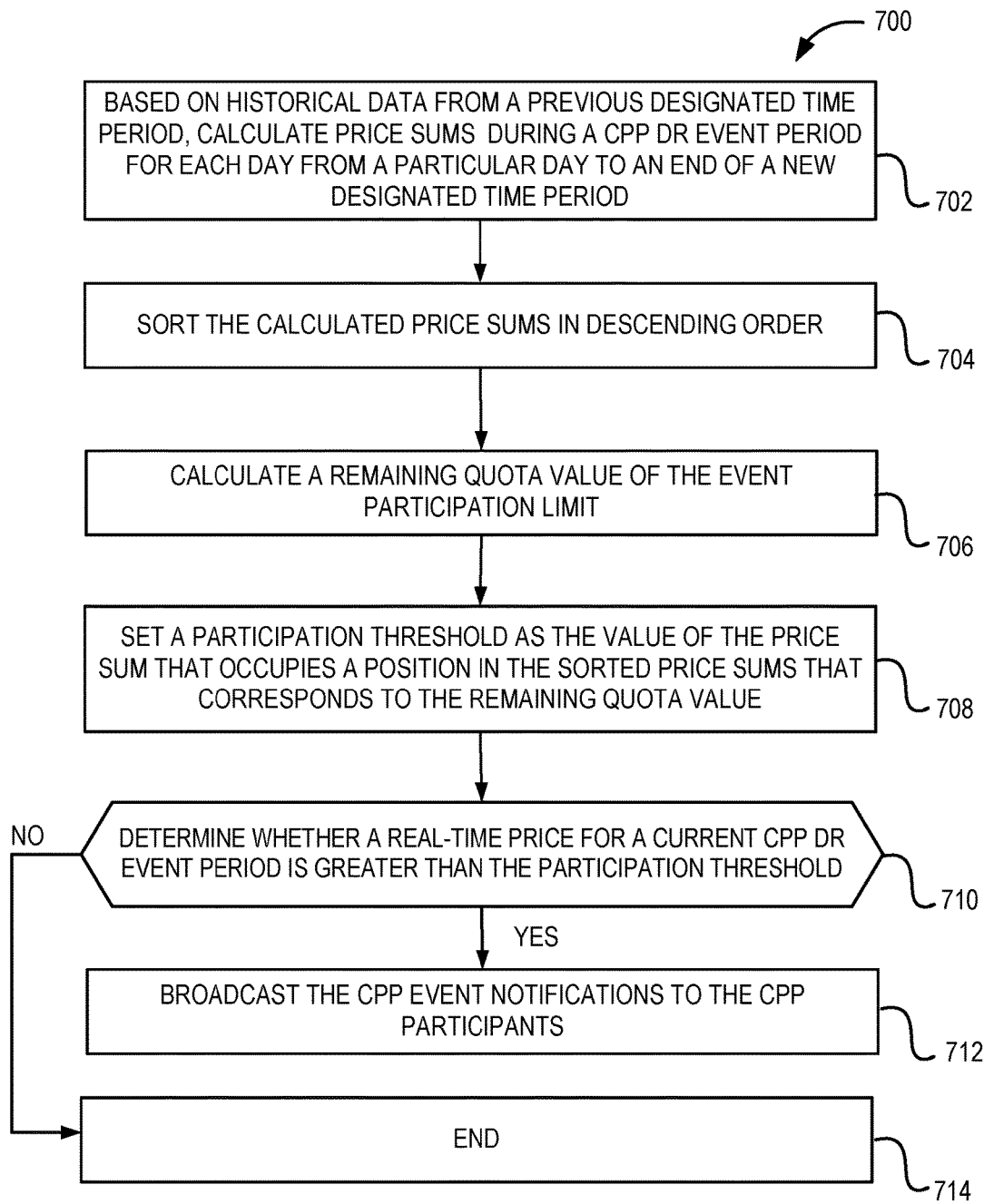
FIG. 7 is a flow diagram of an example CPP participant selection assessment.

FIG. 7 is a flow diagram of an example method 700 of CPP participant selection assessment, arranged in accordance with at least one embodiment described herein. The method 700 may be based on a comparison between a threshold that is based only on historical prices and a particular day price. In some implementations, the method 700 may comprise a portion of another method. For example, the method 700 may be an example of block 620 and/or 610 of the method 600. Although illustrated as discrete blocks, various blocks may be divided into additional blocks, combined into fewer blocks, or eliminated, depending on the desired implementation.

The method 700 may begin at block 702 in which price sums during a CPP DR event period may be calculated. The price sums may be calculated based on historical data from a previous a designated time period such as a previous year. The price sums may be calculated for each day from a particular day to an end of a new designated time period such as a final day of the current year. At block 704, the calculated price sums may be sorted in descending order.

At block 706, a remaining quota value may be calculated. The remaining quota value may include a remaining portion of an event participation limit. At block 708, a participation threshold may be set. The participation threshold may be set as the value of the price sum that occupies a position in the sorted price sums that corresponds to the remaining quota value. For example, the remaining quota value may be equal to five. Accordingly, the participation threshold may be the fifth price sum in the sorted price sums.

At block 710, it may be determined whether a real-time price for the CPP DR event period is greater than the participation threshold. In response to the real-time price being less than the participation threshold ("NO" at block 710), the method 700 may proceed to block 714 in which the method 700 may end. In response to the real-time price being greater than the participation threshold ("YES" at block 710), the method 700 may proceed to block 712. At block 712, CPP event notifications may be broadcast to the CPP participants.

Figure 8:
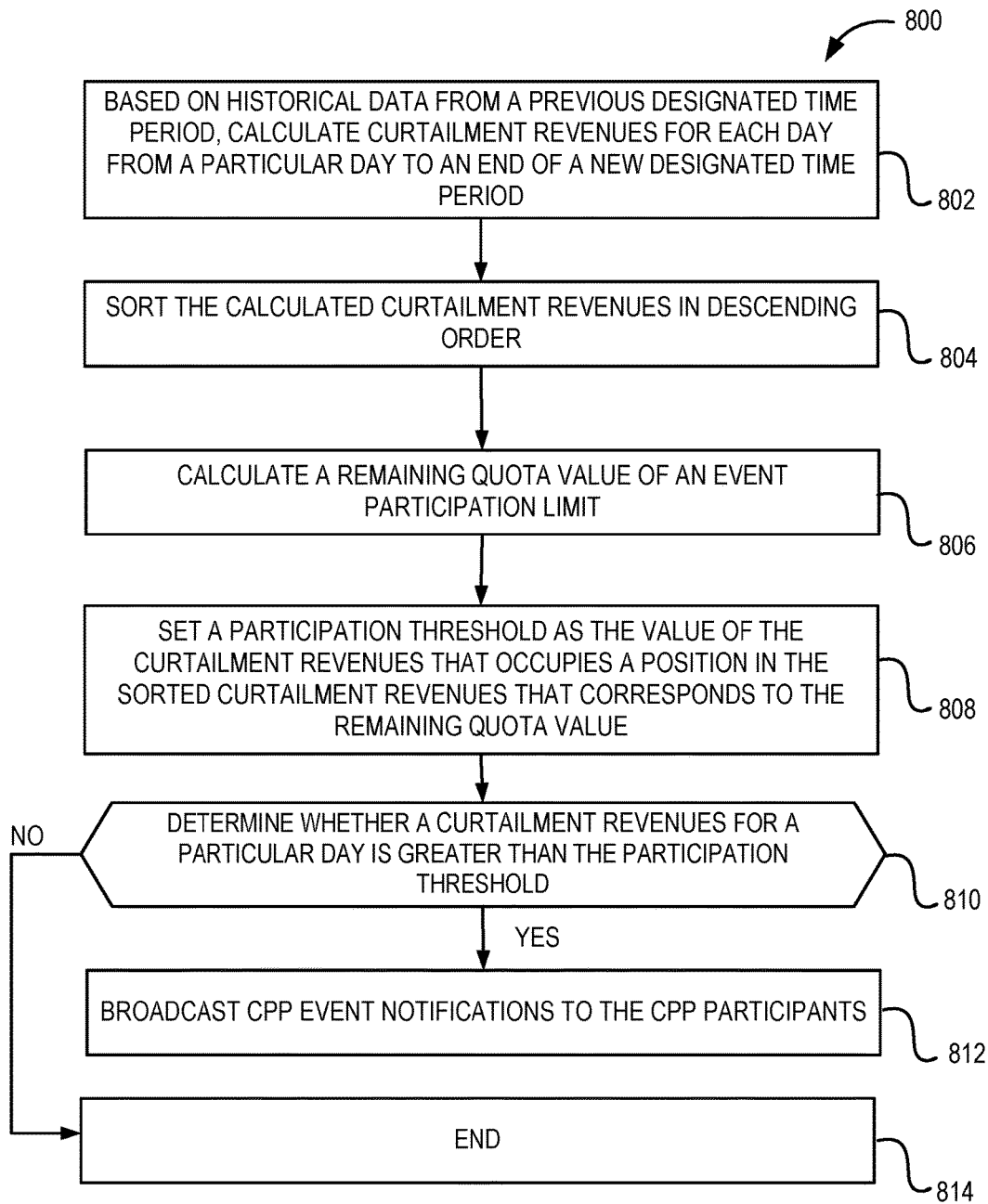
FIG. 8 is a flow diagram of another example CPP participant selection assessment.

FIG. 8 is a flow diagram of an example method 800 of CPP participant selection assessment, arranged in accordance with at least one embodiment described herein. The method 800 may be based on a comparison between a particular day price and threshold that is based on historical prices and load/curtailment of the CPP participants. In some implementations, the method 800 may comprise a portion of another method. For example, the method 800 may be an example of block 612 of the method 600. Although illustrated as discrete blocks, various blocks may be divided into additional blocks, combined into fewer blocks, or eliminated, depending on the desired implementation.

The method 800 may begin at block 802 in which curtailment revenues may be calculated. The curtailment revenues may be calculated for each day from a particular day until a final day of a designated time period such as a final day of the year. The curtailment revenues may be based on historical data from a previous a designated time period such as a data from a previous year. At block 804, the calculated curtailment revenues may be sorted in descending order. At block 806, a remaining quota value may be calculated. The remaining quota value may be a remaining portion of the event participation limit.

At block 808, a participation threshold may be set. In some embodiments, the participation threshold may be set as the value of the curtailment revenues that occupies a position in the sorted calculated curtailment revenues that corresponds to the remaining quota value. For example, the participation threshold may be equal to five. Accordingly, the participation threshold may be equal to the calculated curtailment revenue in the fifth position in the sorted calculated curtailment revenues.

At block 810, it may be determined whether a calculated curtailment revenue for a particular day is greater than the participation threshold. In response to the calculated curtailment revenue being less than the participation threshold ("NO" at block 810), the method 800 may proceed to block 814 in which the method 800 may end. In response to the calculated curtailment revenue being greater than the participation threshold ("YES" at block 810), the method 800 may proceed to block 812. At block 812, CPP event notifications may be broadcast to the CPP participants.

Figure 9A:
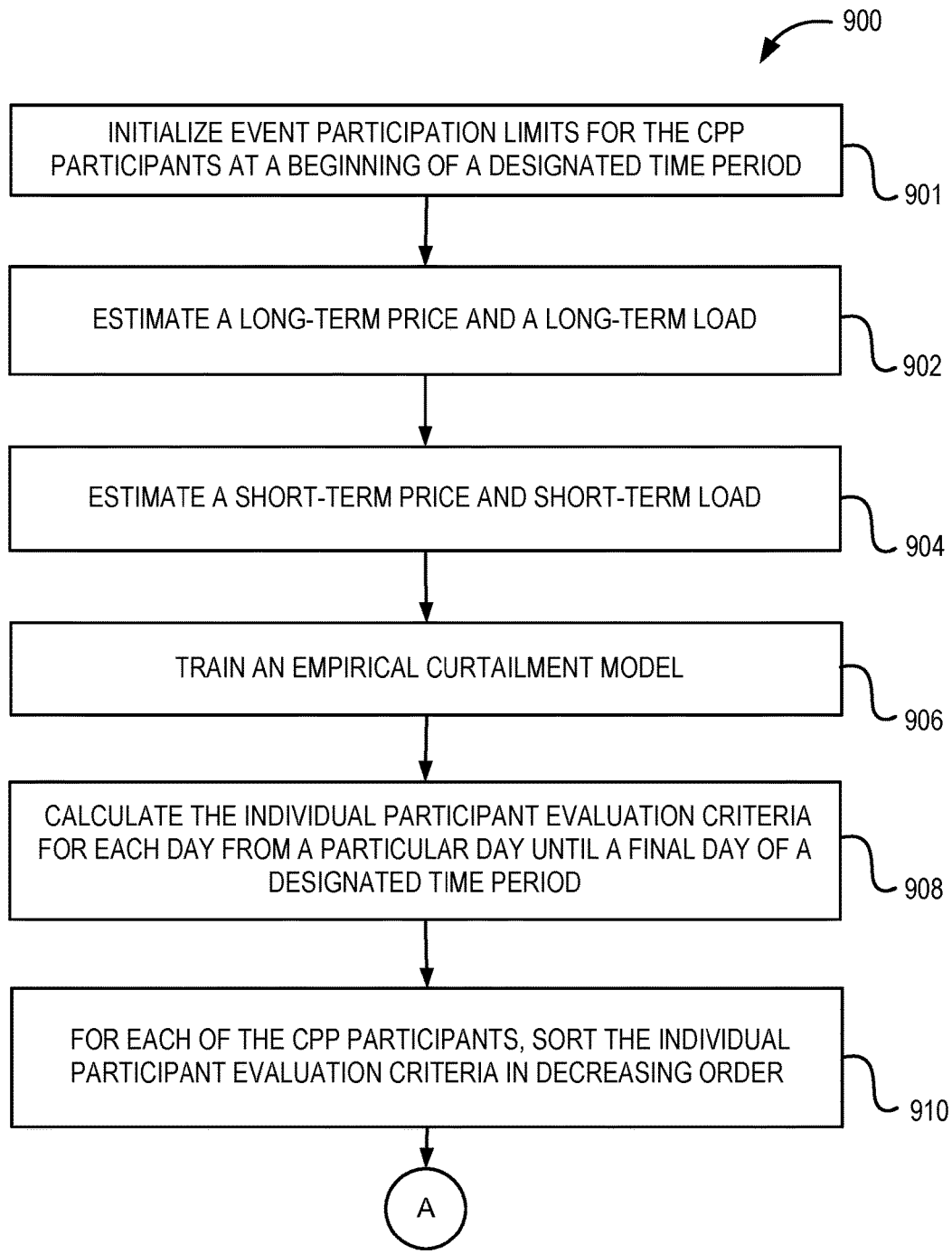
FIGS. 9A and 9B are a flow diagram of another example CPP participant selection assessment.
Figure 9B:
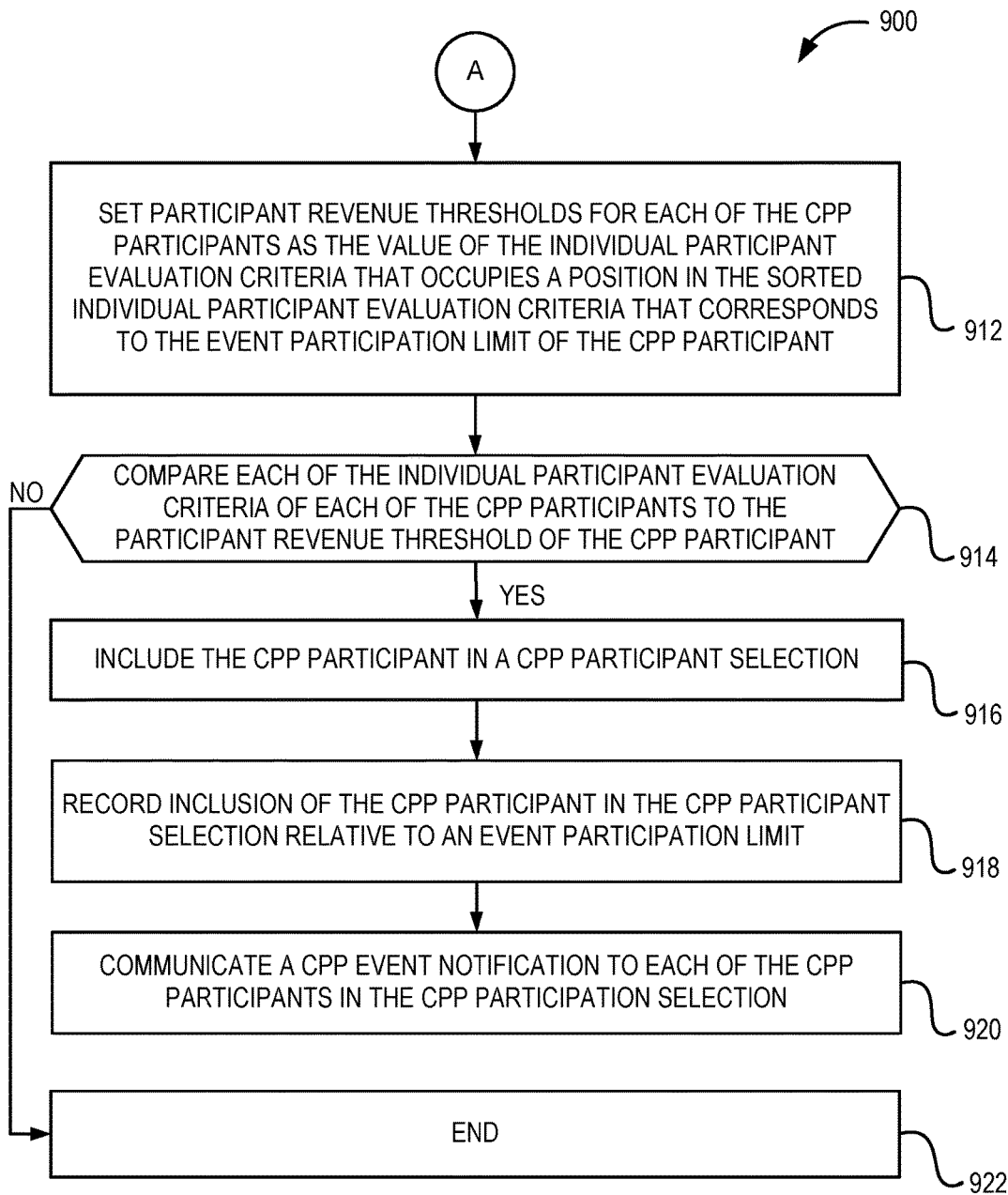

FIGS. 9A and 9B are a flow diagram of an example method 900 of CPP participant selection assessment, arranged in accordance with at least one embodiment described herein. The method 900 may be based on a single individual participant revenue effect calculation. In some implementations, the method 900 may comprise a portion of another method. For example, the method 900 may be an example of block 616 of the method 600. Although illustrated as discrete blocks, various blocks may be divided into additional blocks, combined into fewer blocks, or eliminated, depending on the desired implementation.

Referring to FIG. 9A, the method 900 may begin at block 901 in which event participation limits for the CPP participants are initialized. The event participation limits may be initialized at a beginning of a designated time period such as at the beginning of a year. At block 902, a long-term price and a long-term load may be estimated. In some embodiments, the long-term price and the long-term load may be based on historical real-time price data and the historical load data. Additionally, the long-term price and the long-term load may be estimated for a season, a month, several weeks, or another time period. In some embodiments, the estimated long-term price and the long-term load may be based on a previous designated time period data such as a previous year's data. Additionally, in some embodiments, the historical real-time price data and/or the historical load data may be clustered from the CPP participants into a particular number of clusters using a K-mean cluster. In these and other embodiments, for each of the CPP participants, a nearest cluster may be found and a mean of the nearest cluster may be used to estimate the long-term price and the long-term load for the CPP participant.

At block 904, a short-term price and short-term load may be estimated. The short-term price and the short-term load may be estimated for each of the CPP participants and may be based on the historical load data, the historical real-time price data, recent price data, recent price data, or some combination thereof.

At block 906, an empirical curtailment model may be trained for each of the CPP participants. In some embodiments, the empirical curtailment model may be defined by a curtailment model expression as described above. At block 908, individual participant evaluation criteria may be calculated. The individual participant evaluation criteria may be calculated for each of the CPP participants from a particular day until a final day of a designated time period such as a year. The individual participant evaluation criteria may be based on the estimated long-term price, the estimated long-term load, the estimated short-term price, the estimated short-term load, and the empirical curtailment model. At block 910, the individual participant evaluation criteria may be sorted in decreasing order for each of the CPP participants.

Referring to FIG. 9B, at block 912, individual participant evaluation criteria may be set for each of the CPP participants. The participant revenue thresholds may be set as the value of the individual participant evaluation criteria that occupies a position in the sorted individual participant evaluation criteria that corresponds to the event participation limit or the remaining quota value of the CPP participant.

At block 914, the individual participant evaluation criteria of the CPP participants may be compared to the participant revenue threshold of the CPP participant. In response to the individual participant evaluation criteria of the CPP participant being less than the participant revenue threshold of the CPP participant ("NO" at block 914), the method 900 may proceed to block 922 in which the method 900 ends.

In response to the individual participant evaluation criteria of the CPP participant being greater than the participant revenue threshold of the CPP participant ("YES" at block 914), the method 900 may proceed to block 916. At block 916, the CPP participant may be included in a CPP participant selection. At block 918, inclusion of the CPP participant in the CPP participant selection may be recorded relative to the event participation limit. At block 920, a CPP event notification may be communicated to each of the CPP participants in the CPP participation selection. The CPP event notification may be configured to prompt adjustment of loads of the CPP participants.

In some embodiments, one or more of blocks 902, 904, 906, 908, 910, 912, 914, 916, 918, 920, or some combination thereof may be performed for the particular day in which a CPP DR event is to occur.

Figure 10A:
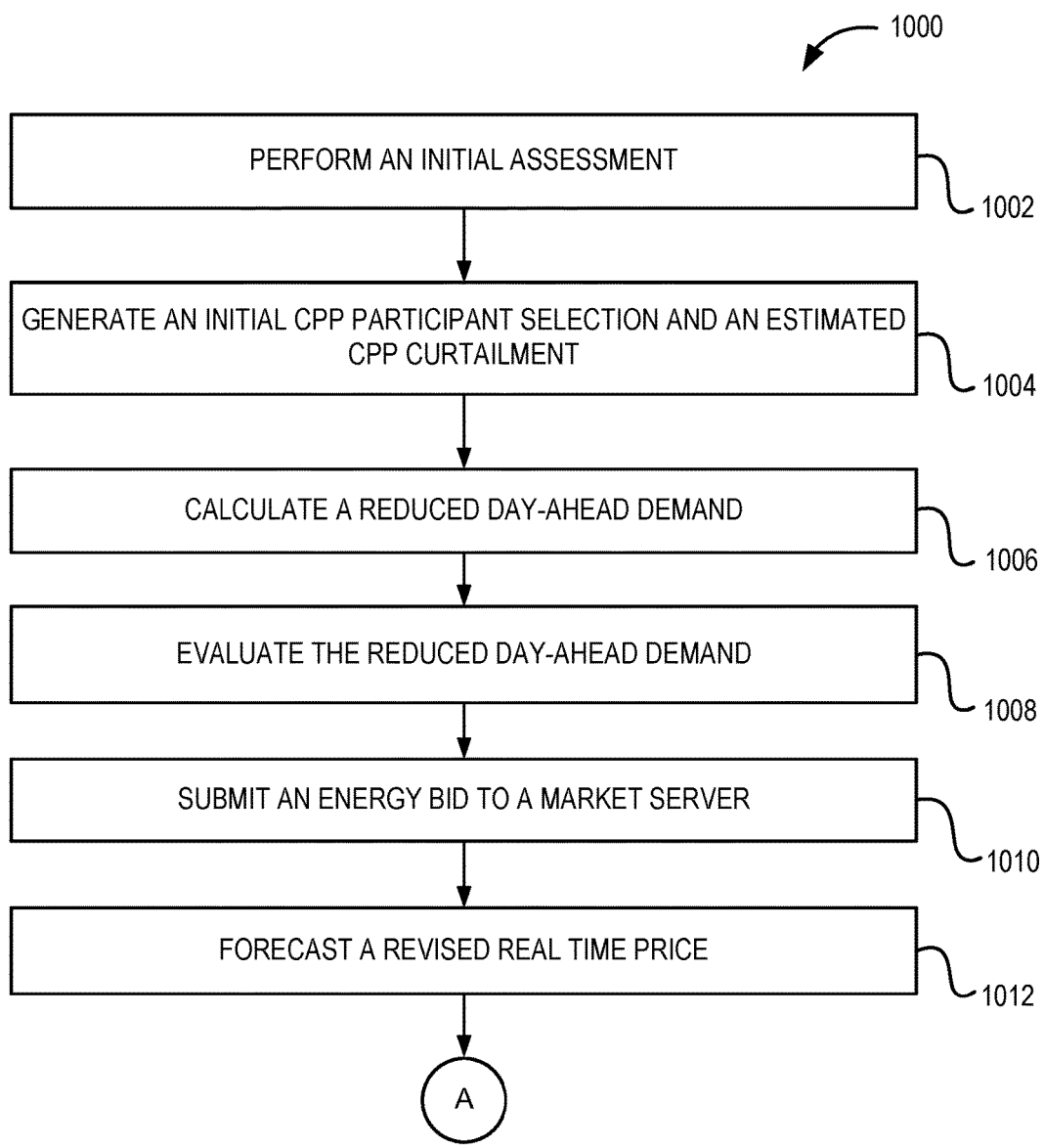
FIGS. 10A and 10B are a flow diagram of another example CPP participant selection assessment.
Figure 10B:
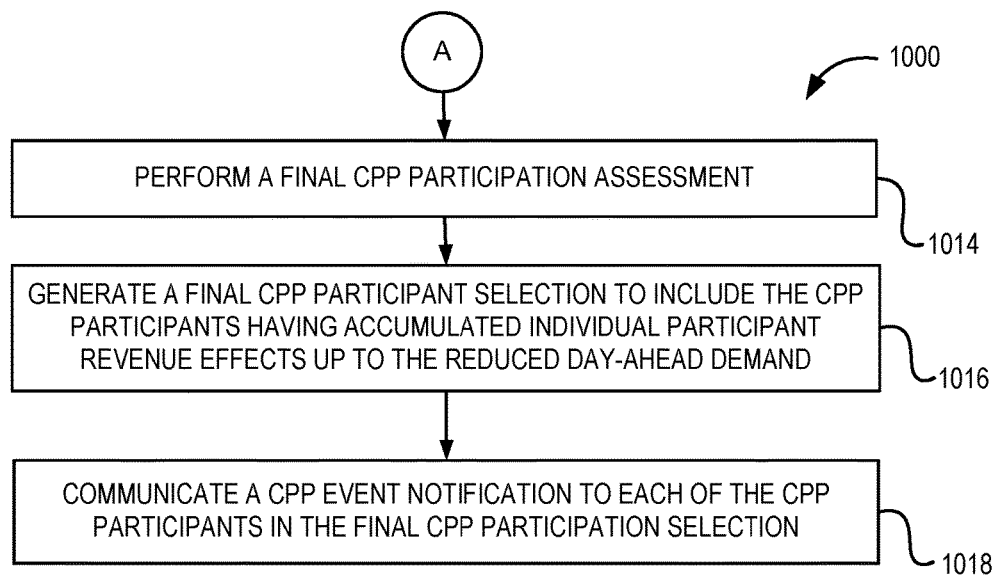

FIGS. 10A and 10B are a flow diagram of an example method 1000 of CPP participant selection assessment, arranged in accordance with at least one embodiment described herein. The method 1000 may be based on an initial individual participant revenue effect calculation and a final individual participant revenue effect calculation. In some implementations, the method 1000 may comprise a portion of another method. For example, the method 1000 may be an example of block 618 of the method 600. Although illustrated as discrete blocks, various blocks may be divided into additional blocks, combined into fewer blocks, or eliminated, depending on the desired implementation.

With reference to FIG. 10A, the method 1000 may begin at block 1002 in which an initial assessment may be performed. In some embodiments, the initial assessment may include a calculation of an individual participant revenue effect for the CPP participants. The individual participant revenue effects may be based on historical real-time price data, historical load data, historical curtailment behavior data, or some combination thereof. The initial assessment may also include a calculation of participant revenue thresholds based on event participant limit. In addition, the initial assessment may include a comparison between the individual participant revenue effects and the participant revenue thresholds.

In some embodiments, the initial assessment may include one or more of blocks 902, 904, 906, 908, 910, and 912 of the method 900. However, in the initial assessment, instead of using the individual participant evaluation criteria, the individual participant revenue effect is used.

In some embodiments, the calculation of the participant revenue thresholds includes determining whether the event participation limit is reached. In response to the event participation limit being reached, the participant revenue threshold may be set to an infinite value.

At block 1004, an initial CPP participant selection and an estimated CPP curtailment may be generated. The initial CPP participant selection and an estimated CPP curtailment may be based on the initial assessment. At block 1006, a reduced day-ahead demand may be calculated. In some embodiments, the reduced day-ahead demand may be a portion of the estimated CPP curtailment.

At block 1008, the reduced day-ahead demand may be evaluated. For instance, the reduced day-ahead demand may be evaluated to ensure that reductions in energy use by the CPP participants of the initial CPP participant selection do not frustrate efficiencies introduced through the estimated CPP curtailment. At block 1010, an energy bid may be submitted to a market server. The energy bid may include a day-ahead demand and a day-ahead price based on the reduced day-ahead demand. At block 1012, a revised real time price may be forecasted based on day-ahead market results received from the market server.

With reference to FIG. 10B, at block 1014, a final assessment may be performed. The final CPP participation assessment may include re-calculating the individual participant revenue effects for the CPP participants based on a forecasted revised real time price. The final CPP participation assessment may include sorting the individual participant revenue effects in decreasing order and calculating accumulated CPP curtailments from the sorted individual participant revenue effects. The final CPP participation assessment may include comparing the accumulated CPP curtailments with the reduced day-ahead demand.

At block 1016, a final CPP participant selection may be generated to include the CPP participants having accumulated individual participant revenue effects up to the reduced day-ahead demand. At block 1018, a CPP event notification may be communicated to each of the CPP participants in the final CPP participation selection. The CPP event notification may be configured to prompt adjustment of loads by the CPP participants.

Figure 11:
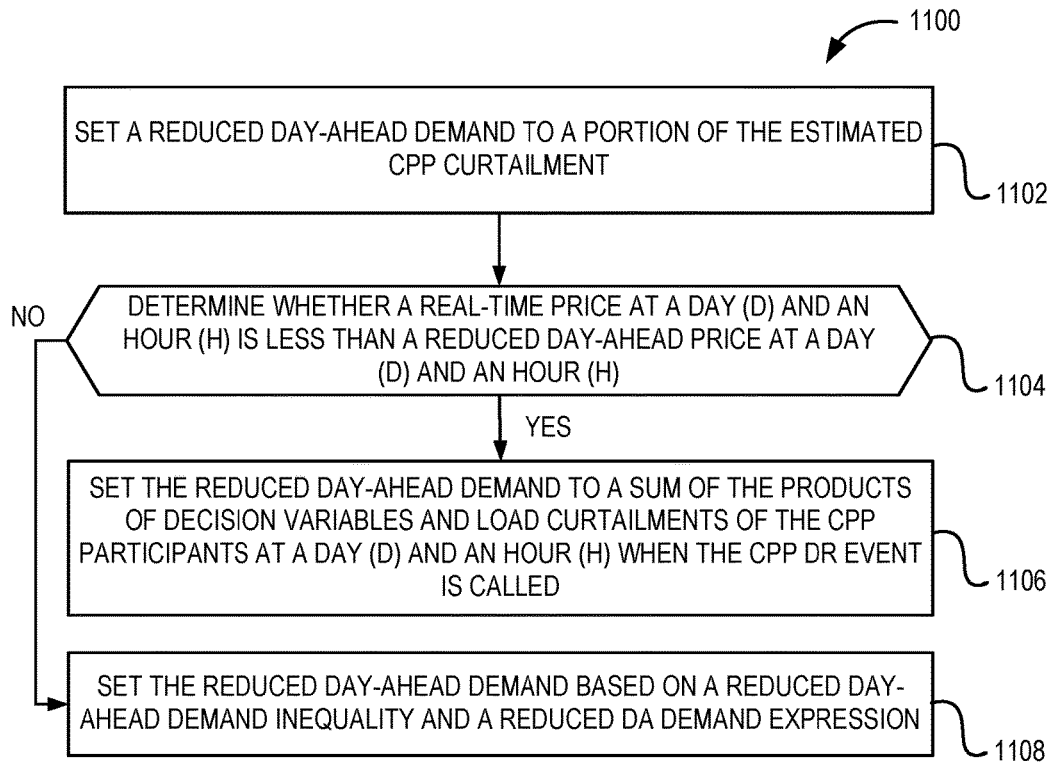
FIG. 11 is a flow diagram of an example method of reduced day-ahead demand evaluation, all in accordance with at least one embodiment described in this disclosure.

FIG. 11 is a flow diagram of an example method 1100 of evaluating the reduced day-ahead demand, arranged in accordance with at least one embodiment described herein. In some implementations, the method 1100 may comprise a portion of another method. For example, the method 1100 may be an example of block 1008 of the method 1000. Although illustrated as discrete blocks, various blocks may be divided into additional blocks, combined into fewer blocks, or eliminated, depending on the desired implementation.

The method 1100 may begin at block 1102 in which a reduced day-ahead demand may be set to a portion of the estimated CPP curtailment. At block 1104, it may be determined whether a real-time price at a day (d) and an hour (h) is less than a reduced day-ahead price at a day (d) and an hour (h). In response to the real-time price being less than the reduced real-time price ("YES" at block 1102), the method 1100 may proceed to block 1106. At block 1106, the reduced day-ahead demand may be set to a sum of the products of decision variables and load curtailments of the CPP participants at the day and the hour when the CPP DR event is called. In response to the real-time price being greater than the reduced day-ahead price ("NO" at block 1102), the method 1100 may proceed to block 1108. At block 1108, the reduced day-ahead demand may be set based on the reduced day-ahead demand inequality and the reduced DA demand expressions described above.

At block 1106, the reduced day-ahead demand may be set to a sum of the products of decision variables and load curtailments of the CPP participants at a day (d) and an hour (h) when the CPP DR event is called.

The methods 600, 700, 800, 900, 1000, and 1100 may be performed in a CPP DR system such as the CPP DR system 100 of FIG. 1. The methods 600, 700, 800, 900, 1000, and 1100 may be programmably performed in some embodiments by the utility server 106 described with reference to FIGS. 1-3. In some embodiments, the utility server 106 or another computing system may include or may be communicatively coupled to a non-transitory computer-readable medium (e.g., the memory 508 of FIG. 5) having stored thereon programming code or instructions that are executable by one or more processors (such as the processor 504 of FIG. 5) to cause a computing system and/or the utility server 106 to perform or control performance of the methods 600, 700, 800, 900, 1000, and 1100. Additionally or alternatively, the utility server 106 may include the processor 504 described above that is configured to execute computer instructions to cause the utility server 106 or another computing system to perform or control performance of the methods 600, 700, 800, 900, 1000, and 1100. Although illustrated as discrete blocks, various blocks in FIGS. 6-11 may be divided into additional blocks, combined into fewer blocks, or eliminated, depending on the desired implementation.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, or any other non-transitory storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module," "component," and/or "engine" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A method of critical peak pricing (CPP) demand response (DR) event implementation, the method comprising:

determining whether CPP event notifications are broadcast to CPP participants in a CPP DR system;

in response to the CPP event notifications being unicast, determining whether curtailment behavior of one or more of the CPP participants is a factor in load estimations during the CPP DR event;

in response to the curtailment behavior being a factor, determining whether DR assessments consider one or more energy market condition factors;

in response to the DR assessments considering the one or more energy market condition factors:

receiving energy usage data from a plurality of sites via smart meters configured to measure energy distributed to the plurality of sites by a utility;

performing an initial CPP participant selection assessment, the initial CPP participant selection assessment including calculating an individual participant revenue effect for the CPP participants; setting participant revenue thresholds based on event participant limit; and comparing the individual participant revenue effects and the participant revenue thresholds;

generating an initial CPP participant selection and an estimated CPP curtailment for an immediately subsequent day based on the initial CPP participant selection assessment;

based on the initial CPP participant selection, calculating a reduced day-ahead demand as a portion of the estimated CPP curtailment;

evaluating the reduced day-ahead demand to ensure that reductions in energy use by the CPP participants of the initial CPP participant selection do not frustrate efficiencies introduced through the estimated CPP curtailment;

submitting an energy bid to a market server, the energy bid including a day-ahead demand and a day-ahead price based on the reduced day-ahead demand;

forecasting a revised real time price for the immediately subsequent day based on day-ahead market results received from the market server;

performing a final CPP participation selection assessment, the final CPP participation selection assessment including re-calculation of the individual participant revenue effects for the CPP participants based on a forecasted revised real time price, sorting the individual participant revenue effects in decreasing order, calculating accumulated CPP curtailments from the sorted individual participant revenue effects, and comparing the accumulated CPP curtailments with the reduced day-ahead demand; and generating a final CPP participant selection to include the CPP participants having accumulated individual participant revenue effects up to the reduced day-ahead demand; and implementing the CPP DR event in the CPP DR system during a period in which the CPP is applied, the implementing the CPP DR event including communication of CPP event notifications to each of the selected participants to lower energy consumption by appliances of the CPP participants.

2. The method of claim 1, wherein:

the individual participant revenue effects are calculated for each of the CPP participants from a current day until a final day of a designated time period; and the initial CPP participation assessment includes:

estimating a long-term price and a long-term load based on historical real-time price data and historical load data, the long-term price and the long-term load being estimated for a seasonal time period;

estimating a short-term price and short-term load for each of the CPP participants based on the historical load data, the historical real-time price data, recent price data, and recent load data;

training an empirical curtailment model for each of the CPP participants;

sorting the individual participant revenue effect in decreasing order for each of the CPP participants;

setting participant revenue thresholds for each of the CPP participants as a value of the individual participant revenue effect that occupies a position in the sorted individual participant revenue effect that corresponds to the event participation limit of the CPP participant;

comparing each of the individual participant revenue effect of each of the CPP participants to the participant revenue threshold of the CPP participant; and in response to the individual participant revenue effect of the CPP participant being greater than the participant revenue threshold of the CPP participant including the CPP participant in a CPP participant selection.

3. The method of claim 2, wherein:

the individual participant revenue effect are re-calculated for each of the CPP participants from a current day until a final day of the designated time period based on the forecasted revised real time price; and the final CPP participation assessment includes:

sorting the re-calculated individual participant revenue effect in decreasing order for each of the CPP participants; and re-setting participant revenue thresholds for each of the CPP participants as the value of the individual participant revenue effect that occupies a position in the sorted individual participant revenue effect that corresponds to the event participation limit of the CPP participant.

4. The method of claim 2, wherein:

the empirical curtailment model is defined by a curtailment model expression:

$L\Delta_{idh} = k \cdot L_{idh}$, in which $L\Delta_{idh}$ represents a load curtailment of one of the CPP participants indicated by an indexing variable i at a day and an hour during the CPP DR event;

k represents a constant factor; and $L_{idh}$ represents a regular load of a CPP participant (i) at a day (d) and an hour (h) when the CPP DR event is called; and the setting of the participant revenue thresholds includes:
  determining whether the event participation limit is reached; and
  in response to the event participation limit being reached, setting the participant revenue threshold to an infinite value.

5. The method of claim 1, wherein the individual participant revenue effect is defined by individual participant effect expressions:

$$\max_{(\{c_{id}\})} \sum_{d=1}^{d=365} c_{id} \cdot [E_i(d)];$$

$$\text{s.t.} \sum_{d=1}^{d=365} c_{id} \leq C_M \ \forall \ i; \text{ and}$$

$$\text{where } E_i(d) = (p_h - p_l) \cdot \sum_{h=h_s}^{h=h_e} L_{idh} + \sum_{h=h_s}^{h=h_e} (p_{RT_{dh}} - p_h) \cdot L\Delta_{idh},$$

in which:

i represents an indexing variable for the CCP participants;
d represents a day;
h represents an hour;
$h_e$ represents an end hour of the DR event;
$h_s$ represents a start hour of the DR event;
$E_i(\ )$ represents an individual participant revenue effect of one of the CPP participants indicated by the indexing variable i;
$L\Delta_{idh}$ represents a load curtailment of one of the CPP participants indicated by the indexing variable i at a day and an hour during the CPP DR event;
$p_{RT_{dh}}$ represents a real-time price at a day and an hour;
$p_{DA_{dh}}$ represents a day-ahead price at a day and an hour;
$p_h$ represents a critical period price; and
$p_l$ represents a non-critical period CPP price.

6. The method of claim 1, wherein the evaluating the reduced day-ahead demand includes:
  determine whether a real-time price at a day (d) and an hour (h) is less than a reduced day-ahead price at a day (d) and an hour (h);
  in response to the real-time price being less than the reduced real-time price, setting the reduced day-ahead demand to a sum of products of decision variables and load curtailments of the CPP participants at a day (d) and an hour (h) when the CPP DR event is called; and
  in response to the real-time price being greater than the reduced day-ahead price, setting the reduced day-ahead demand based on a reduced day-ahead demand inequality and a reduced DA demand expression, wherein:
  the reduced day-ahead demand inequality includes:

$$\frac{p_{DA_{dh}} - p_{DA_{dh_r}}}{p_{RT_{dh}} - p_{DA_{dh_r}}} \geq \frac{\delta_h \cdot \sum_i c_{id} \cdot L\Delta_{idh}}{L_{DA_{dh}}}$$

the reduced DA demand expression includes:

$\delta_h \cdot \Sigma_i c_{id} \cdot L\Delta_{idh}$; and $0 \leq \delta \leq 1$, in which:

i represents an indexing variable for the CCP participants;
$c_{id}$ represents a decision variable for one of the CCP participants indicated by indexing variable i;
d represents a day;
h represents an hour;
$L\Delta_{idh}$ represents a load curtailment of a CPP participant (i) at a day (d) and an hour (h) when a CPP DR event is called;
$p_{RT_{dh}}$ represents a real-time price at a day(d) and an hour (h);
$p_{DA_{dh}}$ represents a day-ahead price at a day (d) and an hour (h);
$L_{DA_{dh}}$ represents a day-ahead demand at a day (d) and an hour (h); and $p_{DA_{dh_r}}$ represents a reduced day-ahead price at a day (d) and an hour (h).

7. The method of claim 1, further comprising:
in response to the CPP event notifications being broadcast, determining whether curtailment behavior of one or more of the CPP participants is a factor in load estimations during the CPP DR event;
in response to the curtailment behavior being a factor:
  calculating curtailment revenues for each day from a current day until a final day of a designated time period based on historical data from a previous designated time period;
  sorting the calculated curtailment revenues in descending order;
  calculating a remaining quota value of an event participation limit;
  setting a participation threshold as a value of the curtailment revenue that occupies a position in the sorted calculated curtailment revenues that corresponds to the remaining quota value;
  determining whether a calculated curtailment revenue for a current day is greater than the participation threshold; and
  in response to the calculated curtailment revenue being greater than the participation threshold, broadcasting CPP event notifications to the CPP participants.

8. The method of claim 7, wherein the curtailment revenues are calculated according to a curtailment revenue expression:

$$O(d) = \sum_{h=h_s}^{h=h_e} \left[ (p_h - p_l) \cdot \sum_i (L_{idh}) + (p_{RT_{dh}} - p_h) \cdot \left( \sum_i L\Delta_{idh} \right) \right],$$

in which:

O( ) represents a curtailment revenue;
d represents a day;
h represents an hour;
$h_e$ represents an end hour of a DR event;
$h_s$ represents a start hour of the DR event;
i represents an indexing variable for CPP participants;
$p_h$ represents a critical period price;
$p_l$ represents non-critical period CPP price;
$L_{idh}$ represents a regular load of a CPP participant (i) at a day (d) and an hour (h) when the CPP DR event is called;
$L_{\Delta idh}$ represents a load curtailment of a CPP participant (i) at a day (d) and an hour (h) when the CPP DR event is called; and $p_{RT_{dh}}$ represents a real-time price at a day(d) and an hour (h).

9. The method of claim 1, further comprising:
in response to the CPP event notifications being broadcast, determining whether curtailment behavior of one or more of the CPP participants is a factor in load estimations during the CPP DR event;
in response to the curtailment behavior not being a factor:
based on historical data from a previous designated time period, calculating price sums during a CPP DR event period for each day from a current day to an end of a designated time period;
sorting the calculated price sums in descending order;
calculating a remaining quota value of an event participation limit;
setting a participation threshold as the value of a price sum that occupies a position in the sorted price sums that corresponds to the remaining quota value;
determining whether a real-time price for the CPP DR event period is greater than the participation threshold; and
in response to the real-time price being greater than the participation threshold, broadcasting CPP event notifications to the CPP participants,
wherein the real-time price is based on broadcast/price-only expressions:

$$\max_{\{[c_d]\}} \sum_{d=1}^{d=365} \sum_{h=h_s}^{h=h_e} c_d \cdot p_{RT_{dh}},$$

and $$\text{s.t.} \sum_{d=1}^{d=365} c_d \le C_M, \text{ in which:}$$

max represents a maximize function;
$c_d$ represents a decision variable for the CCP participants;
d represents a day;
h represents an hour;
$h_e$ represents an end hour of a DR event;
$h_s$ represents a start hour of the DR event;
$p_{RT_{dh}}$ represents a real time energy price at a particular day and hour; and
$C_M$ represents an event participation limit.

10. The method of claim 1, further comprising in response to DR assessments not considering any energy market condition factors:
calculating individual participant evaluation criteria for each of the CPP participants from a current day until a final day of a designated time period based on a forecasted real-time price;
sorting the individual participant evaluation criteria in decreasing order for each of the CPP participants;
setting participant revenue thresholds for each of the CPP participants as a value of the individual participant evaluation criteria that occupies a position in the sorted individual participant evaluation criteria that corresponds to the event participation limit of the CPP participant;
comparing each of the individual participant evaluation criteria of each of the CPP participants to the participant revenue threshold of the CPP participant; and in response to the individual participant evaluation criteria of the CPP participant being greater than the participant revenue threshold of the CPP participant:
including the CPP participant in a CPP participant selection,
recording inclusion of the CPP participant in the CPP participant selection relative to an event participation limit, and
communicating a CPP event notification to each of the CPP participants in the CPP participation selection, the CPP event notification configured to prompt adjustment of loads of the CPP participants.

11. A non-transitory computer-readable medium having encoded therein programming code executable by a processor to perform or control performance of operations comprising:
determining whether critical peak pricing (CPP) event notifications are broadcast to CPP participants in a CPP DR system;
in response to the CPP event notifications being unicast, determining whether curtailment behavior of one or more of the CPP participants is a factor in load estimations during a CPP DR event;
in response to the curtailment behavior being a factor, determining whether DR assessments consider one or more energy market condition factors;
in response to the DR assessments considering the one or more energy market condition factors:
receiving energy usage data from a plurality of sites via smart meters configured to measure energy distributed to the plurality of sites by a utility;
performing an initial CPP participant selection assessment, the initial CPP participant selection assessment including calculating an individual participant revenue effect for the CPP participants; setting participant revenue thresholds based on event participant limit; and comparing the individual participant revenue effects and the participant revenue thresholds;
generating an initial CPP participant selection and an estimated CPP curtailment for an immediately subsequent day based on the initial CPP participant selection assessment;
based on the initial CPP participant selection, calculating a reduced day-ahead demand as a portion of the estimated CPP curtailment;
evaluating the reduced day-ahead demand to ensure that reductions in energy use by the CPP participants of the initial CPP participant selection do not frustrate efficiencies introduced through the estimated CPP curtailment;
submitting an energy bid to a market server, the energy bid including a day-ahead demand and a day-ahead price based on the reduced day-ahead demand;
forecasting a revised real time price for the immediately subsequent day based on day-ahead market results received from the market server;
performing a final CPP participation selection assessment, the final CPP participation selection assessment including re-calculation of the individual participant revenue effects for the CPP participants based on a forecasted revised real time price, sorting the individual participant revenue effects in decreasing order, calculating accumulated CPP curtailments from the sorted individual participant revenue effects, and comparing the accumulated CPP curtailments with the reduced day-ahead demand; and generating a final CPP participant selection to include the CPP participants having accumulated individual participant revenue effects up to the reduced day-ahead demand; and implementing the CPP DR event in the CPP DR system during a period in which the CPP is applied, the implementing the CPP DR event including communication of CPP event notifications to each of the selected participants to lower energy consumption by appliances of the CPP participants.

12. The non-transitory computer-readable medium of claim 11, wherein:
the individual participant revenue effects are calculated for each of the CPP participants from a current day until a final day of a designated time period; and
the initial CPP participation assessment includes:
estimating a long-term price and a long-term load based on historical real-time price data and historical load data, the long-term price and the long-term load being estimated for a seasonal time period;
estimating a short-term price and short-term load for each of the CPP participants based on the historical load data, the historical real-time price data, recent price data, and recent load data;
training an empirical curtailment model for each of the CPP participants;
sorting the individual participant revenue effects in decreasing order for each of the CPP participants;
setting participant revenue thresholds for each of the CPP participants as a value of the individual participant revenue effect that occupies a position in the sorted individual participant revenue effect that corresponds to the event participation limit of the CPP participant;
comparing each of the individual participant revenue effect of each of the CPP participants to the participant revenue threshold of the CPP participant; and
in response to the individual participant revenue effect of the CPP participant being greater than the participant revenue threshold of the CPP participant including the CPP participant in a CPP participant selection.

13. The non-transitory computer-readable medium of claim 12, wherein:
the individual participant revenue effects are re-calculated for each of the CPP participants from a current day until a final day of the designated time period based on the forecasted revised real time price; and
the final CPP participation assessment includes:
sorting the re-calculated individual participant revenue effects in decreasing order for each of the CPP participants; and
re-setting participant revenue thresholds for each of the CPP participants as the value of the individual participant revenue effects that occupies a position in the sorted individual participant revenue effects that corresponds to the event participation limit of the CPP participant.

14. The non-transitory computer-readable medium of claim 12, wherein:
the empirical curtailment model is defined by a curtailment model expression:

$L\Delta_{idh} = k \cdot L_{idh}$, in which $L_{\Delta idh}$ represents a load curtailment of one of the CPP participants indicated by an indexing variable i at a day and an hour during the CPP DR event;
k represents a constant factor; and
$L_{idh}$ represents a regular load of a CPP participant (i) at a day (d) and an hour (h) when the CPP DR event is called; and the setting of the participant revenue thresholds includes:
determining whether the event participation limit is reached; and
in response to the event participation limit being reached, setting the participant revenue threshold to an infinite value.

15. The non-transitory computer-readable medium of claim 11, wherein the individual participant revenue effect is defined by individual participant effect expressions:

$$\max_{(\{c_{id}\})} \sum_{d=1}^{d=365} c_{id} \cdot [E_i(d)];$$

$$\text{s.t.} \sum_{d=1}^{d=365} c_{id} \leq C_M \; \forall \; i; \text{ and}$$

where $E_i(d) = (p_h - p_l) \cdot \sum_{h=h_s}^{h=h_e} L_{idh} + \sum_{h=h_s}^{h=h_e} (p_{RT_{dh}} - p_h) \cdot L\Delta_{idh}$, in which:

i represents an indexing variable for the CCP participants;
d represents a day;
h represents an hour;
$h_e$ represents an end hour of the DR event;
$h_s$ represents a start hour of the DR event;
$E_i(\ )$ represents an individual participant revenue effect of one of the CPP participants indicated by the indexing variable i;
$L_{\Delta idh}$ represents a load curtailment of one of the CPP participants indicated by the indexing variable i at a day and an hour during the CPP DR event;
$pRT_{dh}$ represents a real-time price at a day and an hour;
$p_{DA_{dh}}$ represents a day-ahead price at a day and an hour;
ph represents a critical period price; and
pl represents a non-critical period CPP price.

16. The non-transitory computer-readable medium of claim 11, wherein the evaluating the reduced day-ahead demand includes:
determine whether a real-time price at a day (d) and an hour (h) is less than a reduced day-ahead price at a day (d) and an hour (h);
in response to the real-time price being less than the reduced real-time price, setting the reduced day-ahead demand to a sum of products of decision variables and load curtailments of the CPP participants at a day (d) and an hour (h) when the CPP DR event is called; and
in response to the real-time price being greater than the reduced day-ahead price, setting the reduced day-ahead demand based on a reduced day-ahead demand inequality and a reduced DA demand expression, wherein:
the reduced day-ahead demand inequality includes:

$$\frac{p_{DA_{dh}} - p_{DA_{dh_r}}}{p_{RT_{dh}} - p_{DA_{dh_r}}} \geq \frac{\delta_h \cdot \sum_i c_{id} \cdot L\Delta_{idh}}{L_{DA_{dh}}}$$

the reduced DA demand expression includes:

$$\delta_h \cdot \Sigma_i c_{id} \cdot L\Delta_{idh};  \text{ and}$$

$0 \leq \delta \leq 1$, in which:

i represents an indexing variable for the CCP participants;
$ci_d$ represents a decision variable for one of the CCP participants indicated by indexing variable i;
d represents a day;
h represents an hour;
$L_{\Delta idh}$ represents a load curtailment of a CPP participant (i) at a day (d) and an hour (h) when a CPP DR event is called;
$p_{RT_{dh}}$ represents a real-time price at a day(d) and an hour (h);
$p_{DA_{dh}}$ represents a day-ahead price at a day (d) and an hour (h);
$L_{DA_{dh}}$ represents a day-ahead demand at a day (d) and an hour (h); and $p_{DA_{dh,r}}$ represents a reduced day-ahead price at a day (d) and an hour (h).

17. The non-transitory computer-readable medium of claim 11, wherein the operations further comprise:
in response to the CPP event notifications being broadcast, determining whether curtailment behavior of one or more of the CPP participants is a factor in load estimations during the CPP DR event;
in response to the curtailment behavior being a factor:
calculating curtailment revenues for each day from a current day until a final day of a designated time period based on historical data from a previous designated time period;
sorting the calculated curtailment revenues in descending order;
calculating a remaining quota value of an event participation limit;
setting a participation threshold as a value of the curtailment revenue that occupies a position in the sorted calculated curtailment revenues that corresponds to the remaining quota value;
determining whether a calculated curtailment revenue for a current day is greater than the participation threshold; and
in response to the calculated curtailment revenue being greater than the participation threshold, broadcasting CPP event notifications to the CPP participants.

18. The non-transitory computer-readable medium of claim 17, wherein the curtailment revenues are calculated according to a curtailment revenue expression:

$$O(d) = \sum_{h=h_s}^{h=h_e} \left[ (p_h - p_l) \cdot \sum_i (L_{idh}) + (p_{RT_{dh}} - p_h) \cdot \left( \sum_i L\Delta_{idh} \right) \right],$$

in which:

O( ) represents a curtailment revenue;
d represents a day;
h represents an hour;
$h_e$ represents an end hour of a DR event;
$h_s$ represents a start hour of the DR event;
i represents an indexing variable for CPP participants;
$p_h$ represents a critical period price;
$p_l$ represents non-critical period CPP price;
$L_{idh}$ represents a regular load of a CPP participant (i) at a day (d) and an hour (h) when the CPP DR event is called;
$L_{\Delta idh}$ represents a load curtailment of a CPP participant (i) at a day (d) and an hour (h) when the CPP DR event is called; and
$p_{RT_{dh}}$ represents a real-time price at a day(d) and an hour (h).

19. The non-transitory computer-readable medium of claim 11, wherein the operations further comprise:
in response to the CPP event notifications being broadcast, determining whether curtailment behavior of one or more of the CPP participants is a factor in load estimations during the CPP DR event;
in response to the curtailment behavior not being a factor:
based on historical data from a previous designated time period, calculating price sums during a CPP DR event period for each day from a current day to an end of a new designated time period;
sorting the calculated price sums in descending order;
calculating a remaining quota value of an event participation limit;
setting a participation threshold as the value of a price sum that occupies a position in the sorted price sums that corresponds to the remaining quota value;
determining whether a real-time price for the CPP DR event period is greater than the participation threshold; and
in response to the real-time price being greater than the participation threshold, broadcasting CPP event notifications to the CPP participants,
wherein the real-time price is based on broadcast/price-only expressions:

$$\max_{(\{c_d\})} \sum_{d=1}^{d=365} \sum_{h=h_s}^{h=h_e} c_d \cdot p_{RT_{dh}},$$

and $$s.s.t. \sum_{d=1}^{d=365} c_d \leq C_M, \text{ in which:}$$

max represents a maximize function;
$c_d$ represents a decision variable for the CCP participants;
d represents a day;
h represents an hour;
$h_e$ represents an end hour of a DR event;
$h_s$ represents a start hour of the DR event;
$p_{RT_{dh}}$ represents a real time energy price at a particular day and hour; and
$C_M$ represents an event participation limit.

20. The non-transitory computer-readable medium of claim 11, wherein the operations further comprise in response to DR assessments not considering any energy market condition factors:
calculating individual participant evaluation criteria for each of the CPP participants from a current day until a final day of a designated time period based on a forecasted real-time price;
sorting the individual participant evaluation criteria in decreasing order for each of the CPP participants;

setting participant revenue thresholds for each of the CPP participants as a value of the individual participant evaluation criteria that occupies a position in the sorted individual participant evaluation criteria that corresponds to the event participation limit of the CPP participant;

comparing each of the individual participant evaluation criteria of each of the CPP participants to the participant revenue threshold of the CPP participant; and in response to the individual participant evaluation criteria of the CPP participant being greater than the participant revenue threshold of the CPP participant:
including the CPP participant in a CPP participant selection,
recording inclusion of the CPP participant in the CPP participant selection relative to an event participation limit, and
communicating a CPP event notification to each of the CPP participants in the CPP participation selection, the CPP event notification configured to prompt adjustment of loads of the CPP participants.

21. A critical peak pricing (CPP) demand response (DR) system comprising:
a utility that is associated with a utility server;
a first site that receives energy distributed by the utility, the first site including a first appliance that consumes energy or controls operation of a first device that consumes energy distributed by the utility;
a second site that receives energy distributed by the utility, the second site including a second appliance that consumes energy or controls operation of a second device that consumes energy distributed by the utility;
a first smart meter connected to the first site that is configured to communicate energy usage data to the utility server;
a second smart meter connected to the second site that is configured to communicate energy usage data to the utility server; and
an energy market server communicatively coupled to the utility server and one or more energy sources via a network,
wherein the utility server includes one or more processors and non-transitory computer-readable medium having encoded therein programming code executable by the one or more processors to perform or control performance of operations comprising:
performing an initial CPP participant selection assessment of the CPP DR system, the initial CPP participant selection assessment including calculating an individual participant revenue effect for each of the first site and the second site based at least partially on the energy usage data received from the first and second smart meters; setting participant revenue thresholds for a CPP DR event based on event participant limit; and comparing the individual participant revenue effects for the first site and the second site to the participant revenue thresholds;
generating an initial CPP participant selection that includes one or both of the first site and the second site;
further generating an estimated CPP curtailment for an immediately subsequent day based on the initial CPP participant selection assessment;
based on the initial CPP participant selection, calculating a reduced day-ahead demand as a portion of the estimated CPP curtailment;
evaluating the reduced day-ahead demand to ensure that reductions in energy use by the CPP participants of the initial CPP participant selection do not frustrate efficiencies introduced through the estimated CPP curtailment;
submitting an energy bid to the market server, the energy bid including a day-ahead demand and a day-ahead price based on the reduced day-ahead demand;
receiving day-ahead market results based on the energy bid sent by the utility server and one or more additional energy bids communicated by one or more energy sources;
forecasting a revised real time price for the immediately subsequent day based on day-ahead market results received from the market server;
performing a final CPP participation selection assessment of the CPP DR system, the final CPP participation selection assessment including re-calculation of the individual participant revenue effects for each of the first site and the second site based on the forecasted revised real time price, sorting the individual participant revenue effects in decreasing order, calculating accumulated CPP curtailments from the sorted individual participant revenue effects, and comparing the accumulated CPP curtailments with the reduced day-ahead demand;
determining that the first site has a first accumulated individual participant revenue effect that is included in the reduced day-ahead demand and that the second site has a second accumulated individual participant revenue effect that exceeds the reduced day-ahead demand;
generating a final CPP participant selection to include the first site and exclude the second site; and
implementing a CPP DR event in the CPP DR system during a period in which the CPP is applied, the implementing the CPP DR event including communication of a first CPP event notification to the first site to lower energy consumption by the first appliance or the first device.

* * * * *